(12) United States Patent
Green

(10) Patent No.: US 12,387,165 B2
(45) Date of Patent: Aug. 12, 2025

(54) SYSTEM AND METHOD TO DELIVER GOODS WITH PRECISE HANDLING REQUIREMENTS

(71) Applicant: Covalency, Inc., Bellevue, WA (US)

(72) Inventor: Kathy Green, Bellevue, WA (US)

(73) Assignee: Covalency, Inc., Bellevue, WA (US)

( * ) Notice: Subject to any disclaimer, the term of this patent is extended or adjusted under 35 U.S.C. 154(b) by 365 days.

(21) Appl. No.: 17/880,598

(22) Filed: Aug. 3, 2022

(65) Prior Publication Data

US 2023/0053048 A1 Feb. 16, 2023

Related U.S. Application Data

(60) Provisional application No. 63/228,858, filed on Aug. 3, 2021.

(51) Int. Cl.
*G06Q 30/04* (2012.01)
*G06Q 10/0833* (2023.01)
*G06Q 10/0875* (2023.01)

(52) U.S. Cl.
CPC ..... *G06Q 10/0833* (2013.01); *G06Q 10/0875* (2013.01); *G06Q 30/04* (2013.01)

(58) Field of Classification Search
CPC . G06Q 10/0833; G06Q 10/0875; G06Q 30/04
See application file for complete search history.

(56) References Cited

U.S. PATENT DOCUMENTS

| | | | |
|---|---|---|---|
| 6,715,514 B2 * | 4/2004 | Parker, III | G06Q 10/08 141/1 |
| 9,386,553 B2 * | 7/2016 | Berger | G06Q 10/08 |
| 2012/0246039 A1 * | 9/2012 | Fain | G06Q 40/125 705/341 |
| 2016/0246039 A1 | 8/2016 | Graf et al. | |
| 2020/0023764 A1 * | 1/2020 | Keiser | G06Q 10/0833 |

FOREIGN PATENT DOCUMENTS

KR 10-2010-0024907 A 3/2010

OTHER PUBLICATIONS

International Search Report and Written Opinion mailed Nov. 24, 2022, Patent Application No. PCT/US2022/039349, 12 pages.

* cited by examiner

*Primary Examiner* — Peter Ludwig
*Assistant Examiner* — Reva R Moore
(74) *Attorney, Agent, or Firm* — Davis Wright Tremaine LLP

(57) ABSTRACT

Systems and methods are described for tracking and providing status updates for delivery of a product. An example method may include obtaining a request to process an order for transporting a product between a shipper and a receiver storage location. Shipper and receiver profiles may be identified by accessing a database comprising a plurality of tenant profiles, each profile including specifications associated with handling of the product. A set of instructions for processing the order may be determined from data associated with at least one of the shipper or receiver profiles, and communicated to a carrier device. Status updated may be generated based on data uploaded to the system via the carrier device, where the status updates may be associated with the shipper profile, the receiver profile, or both. A confirmation of the delivery may be generated based on the data obtained from the carrier device.

21 Claims, 23 Drawing Sheets

Good Afternoon,
Pat

← Shipment Details

📅 Sat, 05 Jun 2021

Pickup Number
e9a8ed3d

Status ( Pre-shipment )   ✏️

CARRIER
Enterprise Chemical

DRIVER
Ashutosh Singhai

BOLs

298156
Customer: 869745 – Abc Compounding    ⌄
1200 Burr Ridge Parkway, Burr Ridge, IL 60527

298157
Customer: 869745 – Abc Compounding    ⌄
1200 Burr Ridge Parkway, Burr Ridge, IL 60527

Shipment | Orders | Scan Code | Profile | More

Trailer/Totes ▼ | Search Trailer/Totes | 🔍 | 😊 Good Afternoon! Pat

SHIPMENTS

- Shipments
- Orders
- Products
- Partners
- Locations
- Tanks
- Team Members
- Configuration BOL No. – 288250  CUSTOMER PO – 10148396-2  BILL Date – Fri, 10 Sep 2021  Ship Date – Mon, 05 Jul 2021

FROM
Enterprise Chemical
4711 East Sam Houston Pkwy. South, Pasadena, TX, 77505

Ship To
SME
2665 Office Park Dr., Port Allen, LA, 70767

CARRIER
Favorite Carrier
Baton Rouge, LA, 70801

Timeline

Mon, 05 Jul 2021 ○─○─○─○─○
- Pre Shipment
- Arrived to load
- Transit
- Arrived to unload
- Delivered

FIG. 15

SYSTEM AND METHOD TO DELIVER GOODS WITH PRECISE HANDLING REQUIREMENTS

CROSS-REFERENCE TO RELATED APPLICATION

This application claims the benefit of U.S. Provisional Patent Application No. 63/228,858, filed Aug. 3, 2021, the disclosure of which is incorporated herein by reference in its entirety.

BACKGROUND

Currently, many procedural checklists, safety protocols, and special instructions for loading and unloading goods are managed with email and/or printed documents. A single successful delivery often requires knowhow and input from people who work at different organizations, including the shipper who prepares the goods for pick up, the carrier who delivers the goods, and the receiver of the goods. This reliance on paper and email can have one or more disadvantages of being difficult to 1) share procedures with people who work for different organizations; share real-time delivery events with people from different organizations; store documentation of events during a delivery in a single, shared repository that is accessible by all associated parties from different organizations; record and analyze the reasons for compliance with or deviation from the standard delivery instructions for a single shipment; reference reports after a shipment is completed—paper checklists are often not saved; and analyze trends across multiple shipments to optimize future deliveries.

Additionally, many bulk shipments lack any sort of digital confirmation (like QR or barcode) and record keeping of the digital confirmation that digitally documents that the right product was delivered to the right tank or silo at the right time. Billing for any incremental charges incurred during or after a delivery, known as accessorial charges, is often delayed and difficult to confirm after the fact if the charges are justified and are therefore often difficult to collect payment.

BRIEF DESCRIPTION OF THE DRAWINGS

Various techniques will be described with reference to the drawings, in which:

FIGS. 7-18 show example user interfaces, such as provided by the delivery tracking system of FIG. 1, for processing the delivery of products, according to at least one embodiment.

DETAILED DESCRIPTION

Figure 1:
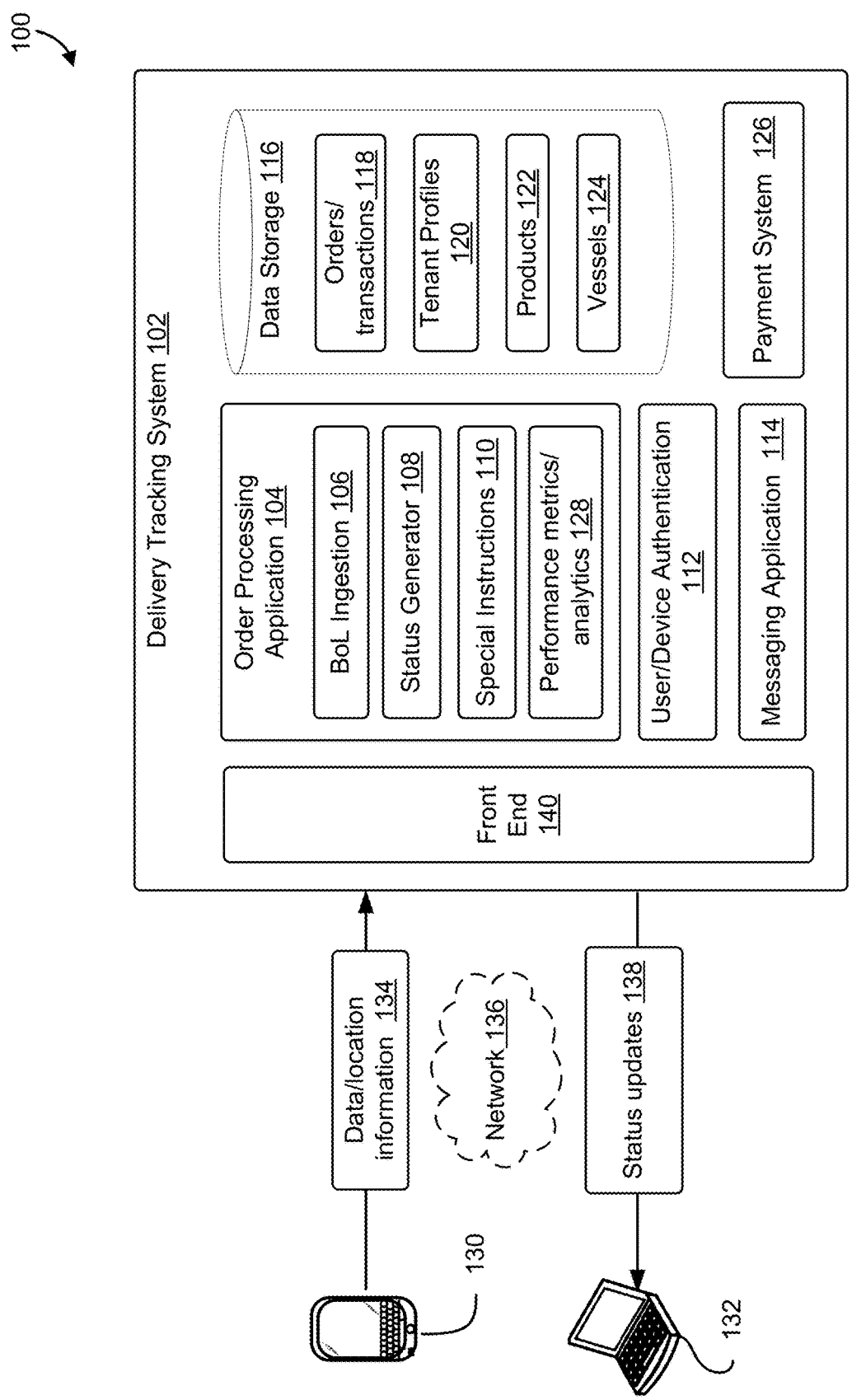
FIG. 1 shows an illustrative example of a delivery tracking system, according to at least one embodiment.

Various embodiments can include a cloud-based software as service (SAAS) platform or system that enables shippers, carriers, and receivers to customize precise delivery instructions to share with their partners, document the execution of the instructions, and analyze factors impacting delivery performance. In some examples, a system collects, stores and shares data via a cloud-based database that is accessed with mobile and desktop devices or clients. Desktop client access can be via a web browser or other suitable interface. Mobile client access can be via a local copy of an application executing on or presented to a mobile device, such as a smart phone, tablet, laptop, and the like. The goal of the platform, in various embodiments, is to provide the right information to the right people to safely and efficiently deliver the right product to the right place at the right time.

In particular, in some examples, the person who is responsible for loading and unloading the cargo can digitally access procedural checklists and pertinent information that the shipper, carrier and receiver requires. For goods that do not already have a digital confirmation of what is loaded and unloaded, the system of various embodiments offers a platform to create, store, share, and read digital confirmation tools like barcoding and QR codes. The platform, in some examples, provides real-time documentation and billing of accessorial charges (e.g., excess charges), such as detention and restocking fees, incurred during a particular delivery. The platform can be designed to enhance, support, and elaborate on existing communication systems such as paper checklists, email, posters, tank labels, 3 ring binders and tribal knowledge that is verbally exchanged.

By digitizing and centralizing the requirements for safe physical transfer that exist in a variety of both digital and non-digital communication systems, in various embodiments, each party may digitally share a profile of their requirements with other platform users (e.g., tenants) prior to, during, and/or after a delivery. Platform members may also create and maintain profiles on behalf of their trading partners in some examples. Details for individual shipments can be checked against a standard that is set up in the database, with the performance against the standard stored in a cloud-hosted database server to document either an error-free delivery or note things that did not go as planned, reducing in various examples the need for drawn out email exchanges about problems and resolving them. Proof of delivery can be automatically communicated to the shipper and receiver once product is delivered, which can reduce the time required to generate an approve invoices. Extra costs incurred for a delivery, like demurrage for waiting to unload, can be documented, approved for payment, and paid within the platform in various embodiments. Trends and other analytics may be tracked, both for individual platform members and in aggregate to provide benchmarked performance against industry peers.

A non-exhaustive list of goods that require precise delivery instructions to avoid potentially dangerous consequences and require assurance that the right product was delivered to the right place at the right time include ingredients for pharmaceuticals, personal care, and food, chemicals, petroleum products, organs for transplant, and radioactive materials. Goods that allow for more of a margin of error in delivery without potentially dangerous outcomes can also benefit from sharing information about what constitutes a perfect delivery to avoid costly, time-consuming errors. Accordingly, while various example embodiments discussed herein relate to the transport of bulk tanker trailers of various sensitive materials, it should be clear that the scope of the present disclosure should not be construed to be limited by these illustrative examples. As used herein, liquid may refer to any of a number of substances having a fluid or even gaseous form (e.g., a fluid), including various industrial chemicals, such as used in producing products or in manufacturing processes, for example, fuels, liquids used in the generating food products, and so on. It should be appreciated that the described techniques, while primarily described in terms of transporting and tracking liquid deliveries, such as may be stored and transported in tanks or vessels, are also equally applicable to other products taking solid forms, packed in various containers or standalone products, such as may be transported on pallets, in shipping containers, etc.

The described techniques may provide a number of benefits over other delivery tracking systems. Those benefits include increased accuracy in tracking delivery of products, particularly fluid products and products that have precise handling requirement, increased safety in transporting chemical products that may be dangerous to the environment and/or human life, and reduced bandwidth usage in communications during and after completion of a delivery to resolve disputes and decrease mistakes. Other benefits and advantages of the described systems and methods will become apparent throughout the rest of this disclosure.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

FIG. 1 shows an illustrative example of a delivery tracking system 102 in communications with various client devices 130, 132 over one or more networks 136. Delivery tracking system 102 may be provided as a cloud-based service, operating on hardware resources, cloud resources, or a combination thereof. The delivery tracking system 102 may include a front end 140 that interface with various client device 130, 132, and provides one or more user interfaces, such as graphical user interfaces, for the various client devices 130, 132 to interact with the delivery tracking system. Example user interfaces will be described in greater detail below in reference to FIGS. 7-23.

The delivery tracking system 102 may also include an order processing application 104 or component, that provides various functionality for system 102. From a high level, the order processing application 104 may create various data objects and modify those data objects to effect deliveries of products. In some cases, the order processing application 104 may ingest or create orders for products, link detailed delivery instructions to those orders, including special instructions, checklists, barcodes, QR codes or other unique identifiers of storage vessels, products, etc. (e.g., referred to as other data), generate and track status of those orders based on data received from devices used to aid in the deliver (e.g., carrier devices, operator devices, etc.).

In some cases, the order processing application 104 may provide a bill of lading (BoL) ingestion component 106 that may, for example scan an image of a BoL, perform OCR or other functions on the BoL to identify specific identifiers of products, vessels or storage locations or containers, partners (e.g., shippers, receivers, and/or carriers), locations, special delivery instructions, etc. The BoL ingestion component 106 may include software that performs these functions and outputs or identifies an order or transaction data object 118, such as may be stored by data storage 116. In some cases, the system 102 utilizes a BoL to identify or generate an order 118, which may be used by the system 102 to organize various information about the order or transaction, provide updates to various entities within the system, etc. An example of an order or transaction data structure will be described in greater detail below in reference to FIG. 2.

In some cases, the order processing application 104 may receive data, such as data 134 from various devices to access and modify status of various orders 118. In some cases, a device, such as device 130 may scan or otherwise submit an identifier of an order or BoL, a tenant, or a product or product container (such as a storage vessel, tank, etc., which may be either mobile or stationary) to system 102. The unique identifier may be a QR or barcode or some other type of identifier, such as alpha numeric identifies. In response, the order processing application 104 may identify the item so identified (e.g., an order 118, tenant 120, product 122, or vessel 124), and access the order 118 relating to the item identified to update data associated with the order 118. The data update may include changing a status of an order, or update information associated with order, such as via a status generator 108 as described below. In some cases, the system 102 may support various IoT type devices, such as pad locks, or other devices. These devices and the codes used to access them (e.g., unlock a lock) may be stored and provided by the system 102 to facilitate better security for various products, storage locations, facilities, etc., while reducing the time-consuming process of obtaining and tracking manual keys to access these things. In these examples, the system may receive an identifier of the IoT or other device, and upon accessing and verifying that the submitting device is authorized to access the IoT (e.g., via the user/device authentication component 112), may submit a code or other means to enable access to the IoT device (e.g., unlocking a lock).

The order processing application or component 104 may also include a status generator 108, which may ingest various data 134 from client devices 130, such as may be associated with a carrier or transporter of goods (e.g., carrier device 130). The various data may include a variety of data, such as documentation of the goods or product to be shipped and/or surrounds or environment relating to the goods or products (e.g., notes, images, video, etc.), scans of identifiers of the product(s) or storage vessels holding the product(s), such as barcodes, QR codes or other identifiers of tanks or vessels used to hold liquids, documentation of compliance with special instructions or checklists, compliance with safety protocols, and the like. In some cases, the data uploaded by the device may include time stamp information and/or geolocation information (such as from GPS or other similar technologies), relating to any object, action, or environment relating to the delivery. In some cases, the timestamp and/or geolocation information may be correlated to one or more of various stages in the delivery process, such as one or more stages illustrated and described below in reference to FIG. 3. In yet some examples, the data 134 may include compliance or indications of compliance with checklists or special instructions for the delivery, such as may be associated with one or more of the shipper or receiver profiles in data storage 116. In yet some instances, the data 134 may include indications of additional, excess, or accessorial charges relating to the delivery, such as may be caused by delays at various stages of the delivery, such as denied or delayed access to a facility, waiting for vehicles or other objects to be removed to allow access to the products, and so on. In some cases, evidence of the delay, such as time stamp, geolocation, and/or images or video may also be uploaded to justify delays and/or the additional charges.

In yet some examples, data 134 may be received from one or more devices 130. In this example a first device may be an operator device, such as associated with the shipper or receiver of goods. An operator using the operator device may be responsible for helping to load or unload the product for delivery, and/or performing any of a number of tasks relating to the delivery, such as aiding in compliance with safety protocols, enabling access to facilities storing the product, providing vehicles, forklifts, etc., to effectuate transform of the product or products, and so on. Another device, such as associated with the carrier, may also upload various data to the system 102. The status generator 108 may use the data 134 to generate various status updates which may be associated with the order record or data object 118 and shipper and carrier profiles (e.g., tenant profiles 120) in the data store 116. The status generator, in some cases, may push status updates 138 and/or notifications thereof to device(s) 132 associated with those profiles or accounts.

The order processing application or component 104 may also include a special instructions component 110, which may identify and/track special instructions relating to a specific order. The special instructions may include special handling, loading, or unloading instructions or requirements for a given order, may include one or more compliance checklists (e.g., for safety) to be completed by a carrier of the product or products in an order, and so on. As used herein, the special instructions component may also include and track and update checklists associated with an order.

Figure 18:
Figure 19:
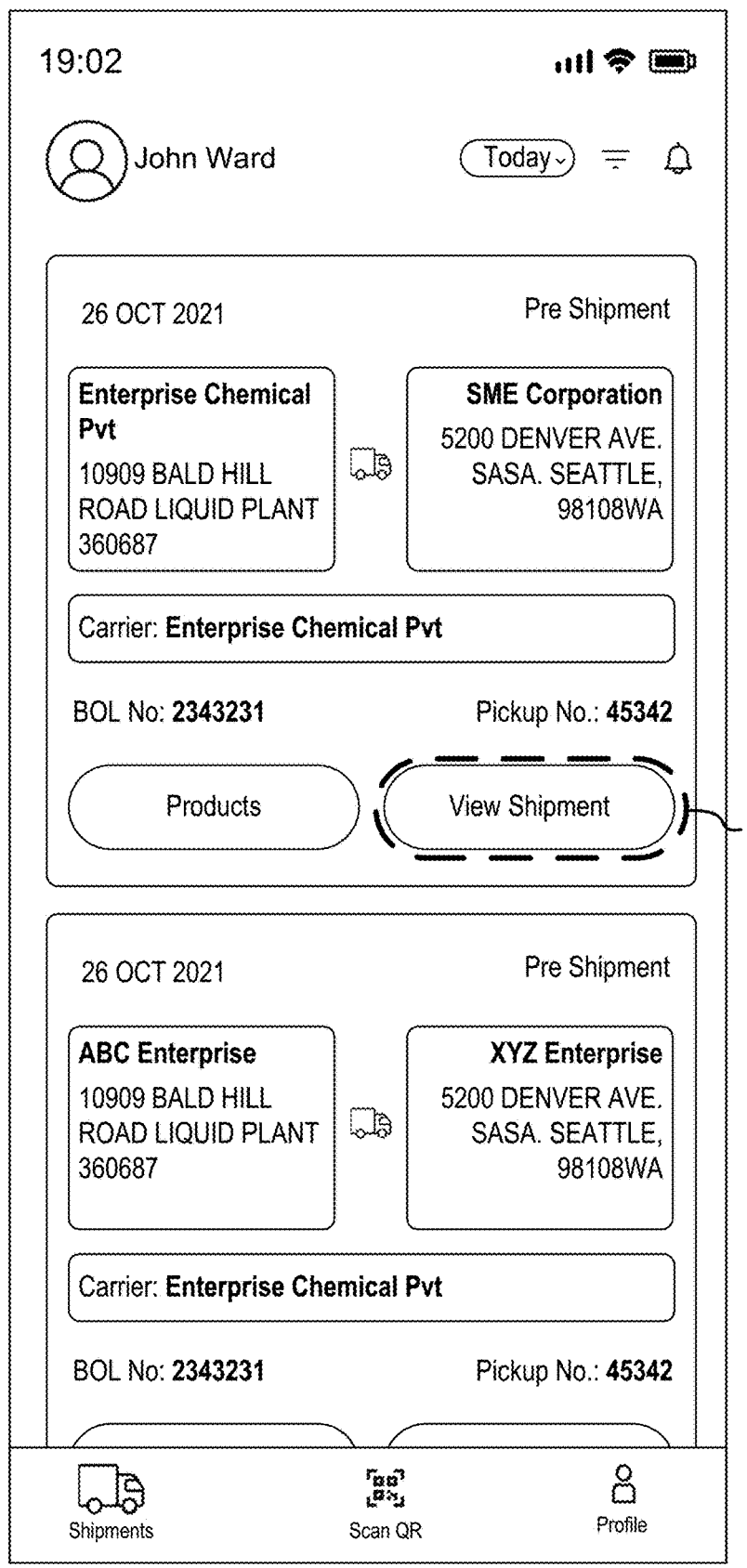
FIGS. 19-23 show example user interfaces, such as provided by the delivery tracking system of FIG. 1 to a carrier device, for processing the delivery of products, according to at least one embodiment.
Figure 20:
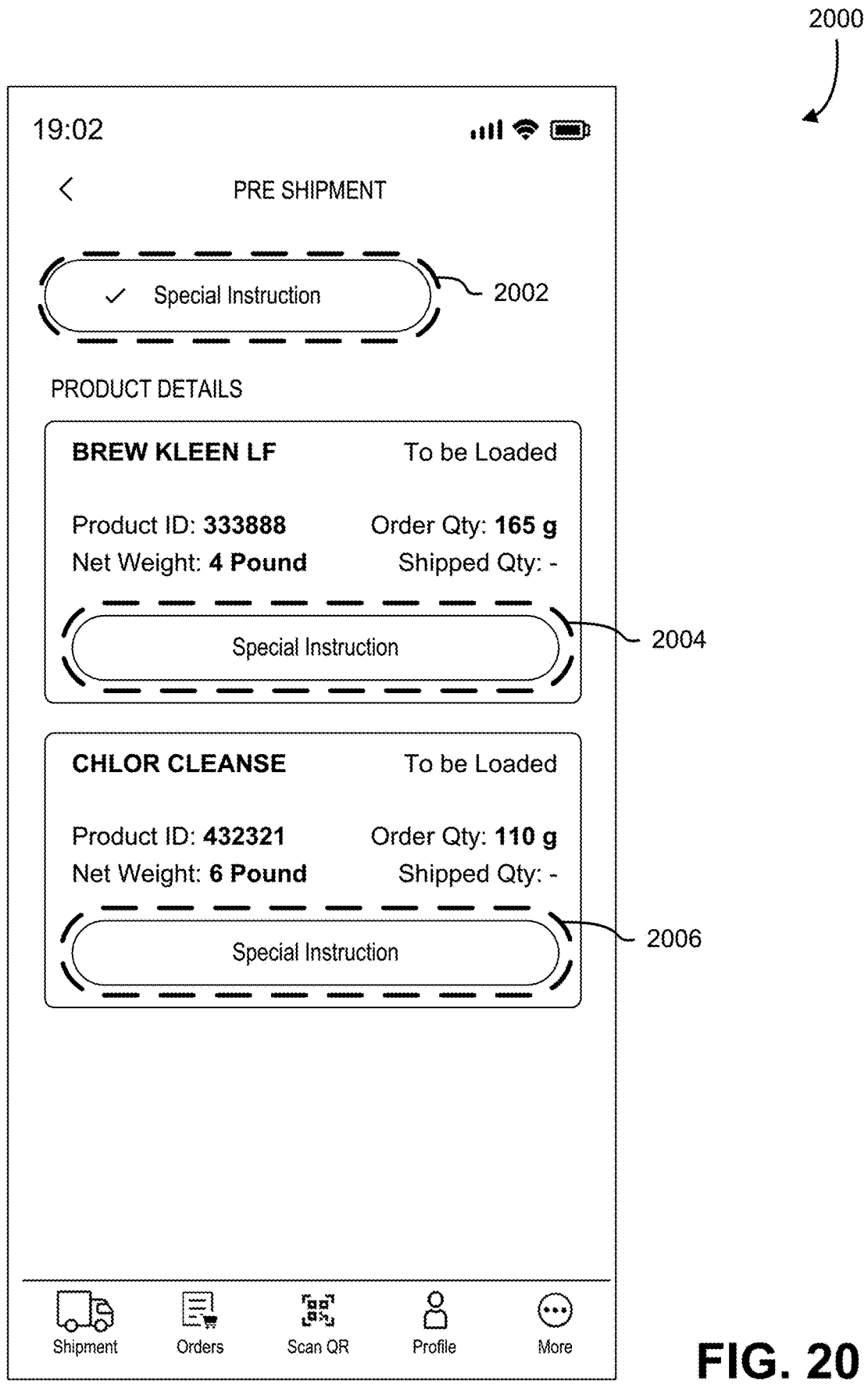
Figure 21:
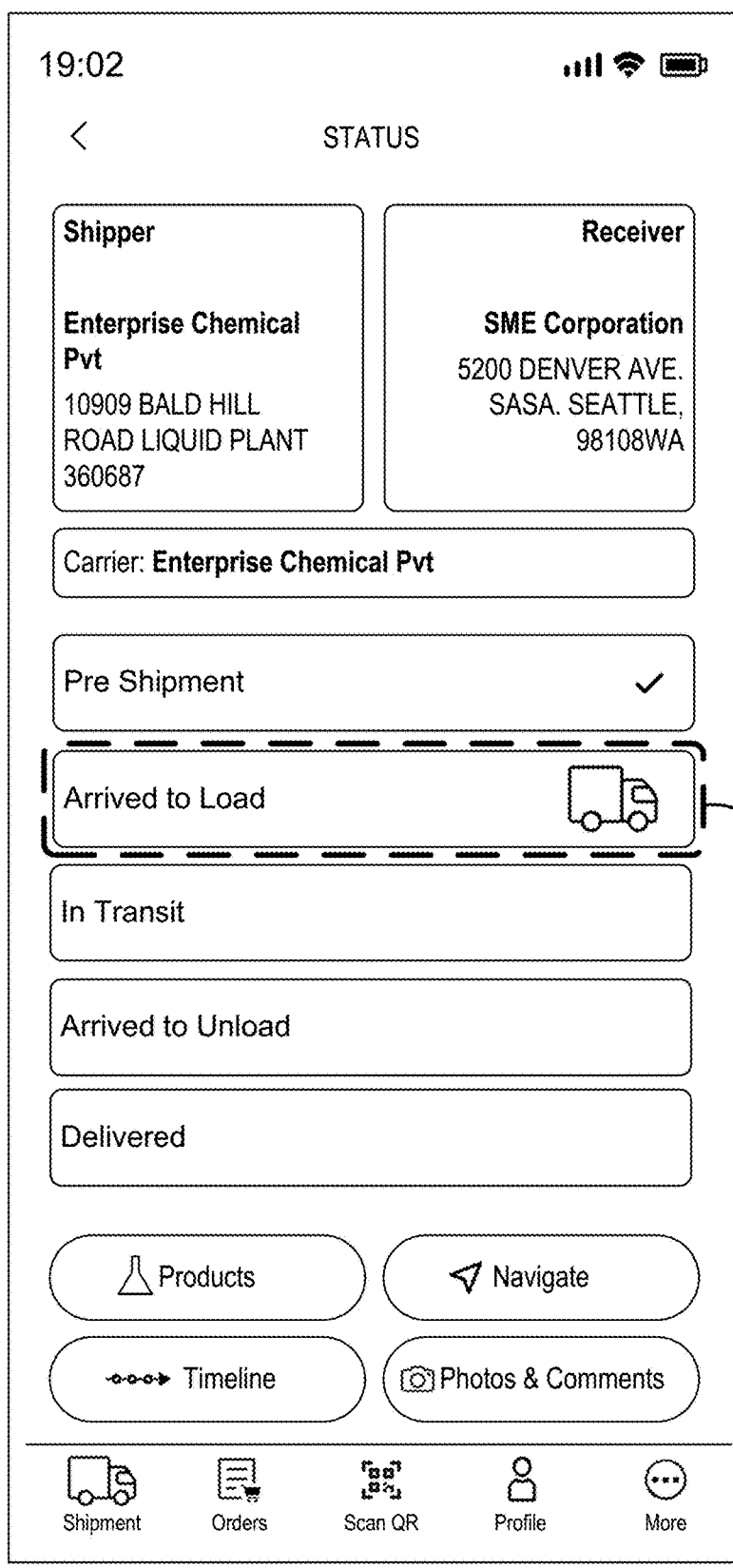
Figure 22:
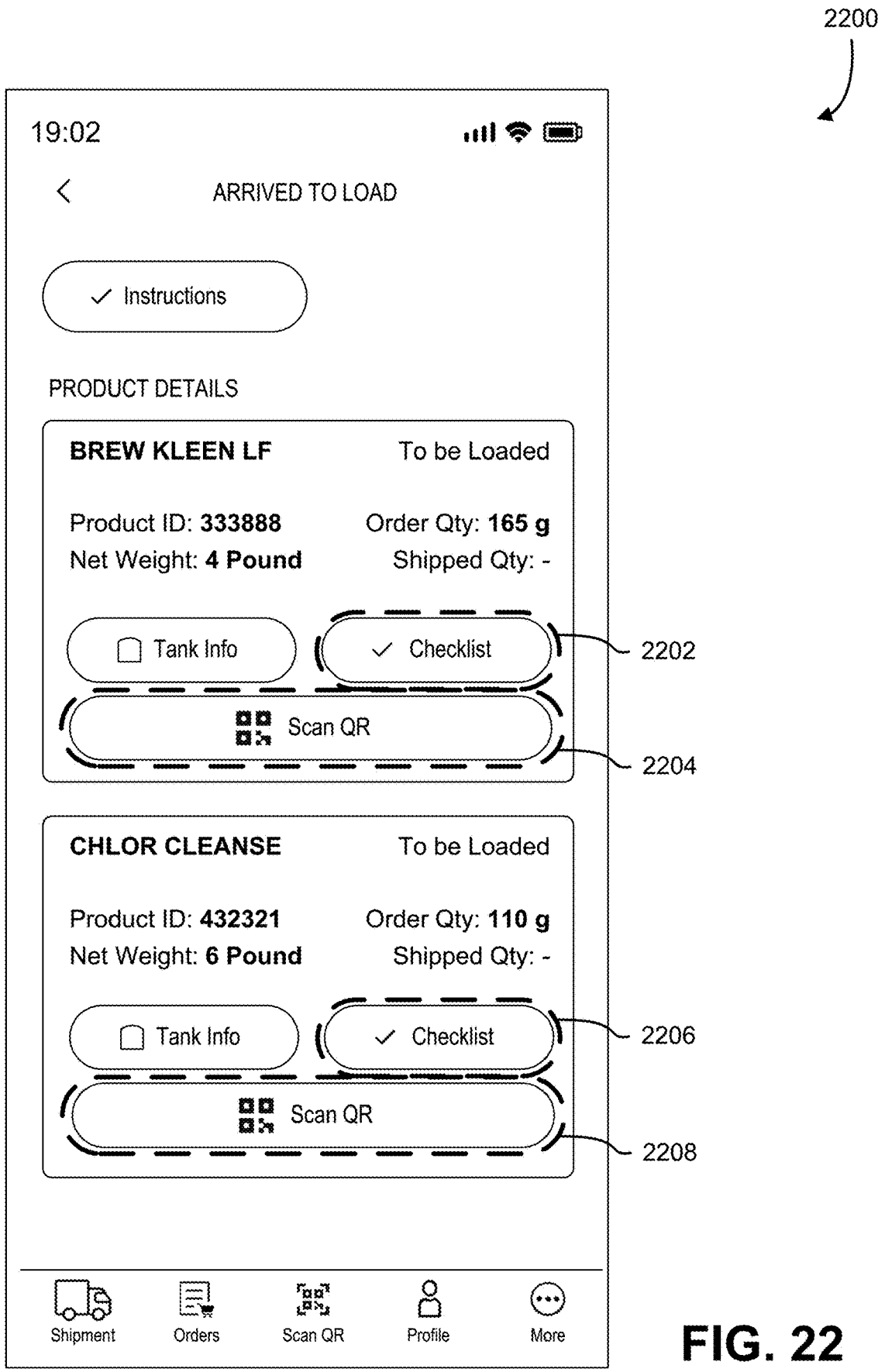
Figure 23:
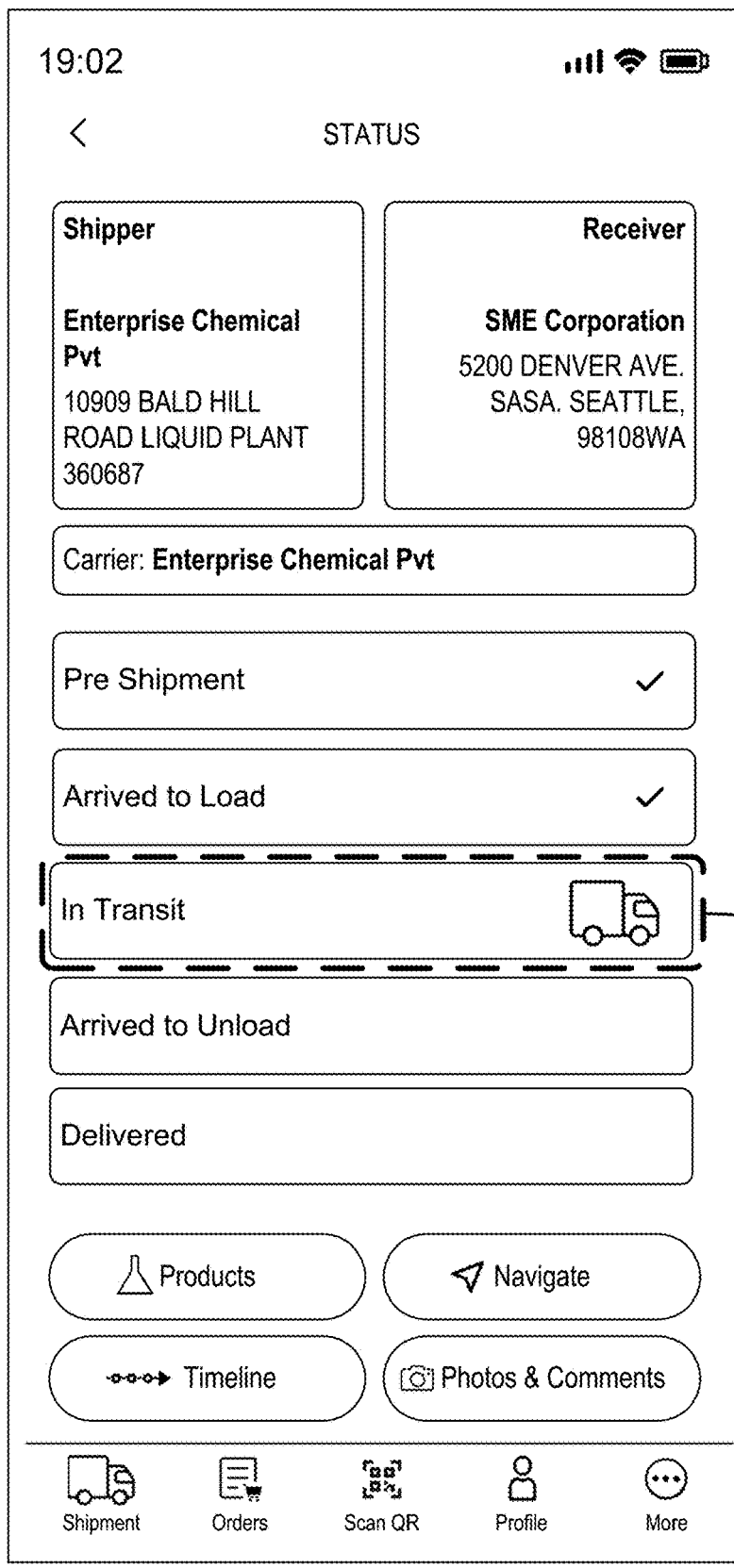

In yet some cases, the order processing application or component 104 may also include a performance metrics/analytics component, which may aggregate various metrics across multiple orders or transactions and provide trend information and other patterns or historic representations of these metrics, such as through one or more graphical user interfaces. An example metrics view is illustrated in FIG. 18.

In some aspects, the delivery tracking system 102 may also include a user device authentication component 112. The user device authentication component 112 may authenticate various users and/or devices within the system 102, to help provide data security features and ensure that confidential information is maintained securely. In some cases, component 112 may be implemented by a third-party service, such as Auth0.

In some aspects, the delivery tracking system 102 may also include a messaging application 114, which may enable various users of the system 102 to connect in real time to provide and adapt to changes to orders, updated information received from carriers and the like. In some examples, the messaging application or platform 114 may enable shippers and or receivers to communicate with each other and with carriers to adapt to changes in conditions, needs, orders, etc. In some cases, the messaging application 114 may be provided by an external service, such as Sengrid.

In some aspects, the delivery tracking system 102 may also include a payment system 126. The payment system 126 may be an integrated part of system 102 or may be provided by a third-party service, such as Stripe. The payment system 126 may, in some cases, obtain data 134 uploaded from a carrier device 130 that may affect the cost of shipped products, such as may include costs associated with delays and the like. The payment system 126, in some cases, may generate invoices upon completion of an order or transaction, to include/account for various data 134 that may be provided by a carrier device during a delivery, including evidence of delays and increased costs.

In some aspects, the delivery tracking system 102 may also include a messaging data storage system or service 116, which may be any of a number of various storage devices, services, cloud-based resources, etc., In some aspects, the data storage component 116 may include PostgreSQL, Mongo DB Atlas, and/or various other data storage technologies, services platforms, etc. As described in some detail above, data storage 116 may store various data relating to a facilitating delivery and tracking of orders for products, such as may include fluid products and/or hazardous materials. In some examples the database 116 may store orders/transactions 118, tenant profiles, products 122 and/or vessels or storage containers/devices 124.

Tenant profiles (or simply profiles) 120 can outline the expectations for what constitutes a flawless delivery and can be created from the perspective of a shipper, carrier, or receiver of goods. To accommodate the spectrum of detail required for different goods depending on their application and risk potential for not adhering to handling instructions, the platform structure can allow for members or tenant to set up custom profiles and expectations for shipping and/or receiving. Each Entity, which can be defined as set of records used to manage data, in the platform can be customizable to the number and type of fields that are required to fully describe the Entity. Entities can be combined to create a complete profile. Table 1 outlines one specific example of each of the Entities that constitute a profile for a Tenant, defined in some embodiments as a company, organization or governmental agency that is a Platform member.

Though there is a minimum requirement to set up profiles in various examples, the platform tenants in some embodiments can define the fields they need to effectively communicate their requirements and can customize the level of detail suitable for the products they are handling and the risk involved with handling the product incorrectly.

TABLE 1

Example Platform Member Profile Data of One Embodiment

| Entity (set of records used to manage data) | Example Definition and General Examples | Chemical Shipment Examples |
|---|---|---|
| Tenant or Platform Member | The company/ organization/governmental agency that ships/receives goods | Same |

TABLE 1-continued

Example Platform Member Profile Data of One Embodiment

| Entity (set of records used to manage data) | Example Definition and General Examples | Chemical Shipment Examples |
|---|---|---|
| | and stores the info for what constitutes a perfect delivery in the Platform. | |
| Users or Team Members | The people authorized to access the platform on behalf of their employer. | The basic user types are admin and driver. Admins have access to all of the transactions in the app. The admin primarily uses the web portal for managing the entities for their tenant. The driver primarily uses the mobile application in iOS or Android to refer to information and record the details of a particular delivery. |
| Locations | The physical address that the Tenant ships from and/or to. Locations may be physically owned by the Tenant and/or may be set up on behalf of organizations they either ship-to or receive from. | A tank farm at a manufacturing site, a tank farm at a distributor's facility, a tank farm at third party terminal operation, a warehouse, at bulk storage tank at a place that consumes chemicals and may or may not be a Tenant in the platform |
| Partners | The company/ organization/governmental agency name and physical address the Tenant ships or receives goods that are also Tenants in the platform. Partners must minimally have a name, address, and unique partner number that typically comes from the Tenant's ERP. | A tank farm at a manufacturing site, a tank farm at a distributors facility, a tank farm at third party terminal operation, a warehouse, a bulk storage tank at a place that consumes chemicals and is a Tenant in the platform |
| Products | The products that the platform member produces, distributes or consumes. Products are minimally described with a product name and product number that typically match the name and number in the Tenant's ERP. Additional details including packaging, specifications, certifications, safety data sheets, etc. may be included in describing a unique Product Number. | The same chemical will likely have different product numbers for different Tenants. Each Tenant customizes the product to match the bill of lading product number that is used to deliver to the Storage Vessel. A driver who is unsure about the chemical and physical properties and how to handle a chemical can click on a link to see a safety data sheet for the chemical that will outline what personal protective equipment is required to safely load and unload. |
| Holding Vessel: including Stationary Storage Vessels like Tanks and Silos, Refillable Drums/Totes, Tanker Trailers, Box Vans, Hopper Trailers, Railcars, Barges, Ocean-Going Vessels | The unique set of information for how to handle the product stored in the vessel(s) that: holds the goods where they are manufactured holds the goods where they are warehoused or stored in bulk for further distribution transports the goods Vessels may have unique IDs imported from the Tenant's ERP. Vessels are also assigned a unique Platform ID. In addition to text fields, vessels that hold product may have pictures of the vessel and surround areas that may better communicate important info that words alone. | Tanks are bulk storage vessels used for liquid chemicals. Tanker trailers transport the goods. Warehouses hold packaged goods. Tanks have a variety of materials of construction, placement relative to a safety shower, the kind of valves are truck needs to have to connect to it, etc. The hours that the tank can be connected to, who to call, and how the materials should be handled in the tank all contribute to a unique tank profile. Silos are bulk storage vessels for dry chemicals. Photos of tanks, safety showers, and surrounding areas can enhance text descriptions. |
| Checklist Creation | Special instructions that require User input during a delivery. The Checklists are customized for each Tenant. | Same |

Once Profiles are set up in the Platform, the Tenant can share the requirements for a flawless delivery with their employees and/or Partner organizations (e.g., other users of system 102). The details in the Profiles can be applied to individual transactions for physically moving goods from a shipper to a receiver via a carrier. The transaction data the Platform tracks can be based off the bill of lading (BOL), a shipping document that accompanies goods during the delivery that declares where the product is picked up, where it will be delivered, what the product is, the quantity of product to be delivered, etc., plus special instructions that may be communicated on a bill of lading, via other documents or verbally. Multiple truck BOLs bound for different customers can be combined into a single Shipment. BOLs may have information for more than one product to deliver to single facility at a time.

TABLE 2

Physical Delivery Transactions In Accordance with one Example Embodiment

| Transaction Component | Definition and General Examples | Chemical Shipment Examples |
|---|---|---|
| Orders/ Deliveries | Goods listed on a single Bill of Lading (BOL) typically referencing a Purchase Order (Order). Can be a single good or multiple goods. Generally bound for a single physical address also known as a "Ship To" The BOL number is the unique ID associated with a particular delivery. This reference number serves as a virtual file folder to keep all the details with what should happen and what actually happened during a delivery. | A refinery might have three tanks that hold sodium hydroxide, so a single BOL might include a stop at three tanks to pump out of one large tanker trailer A water treatment facility might use both sodium hydroxide and sodium hypochlorite and a minibulk truck may have compartments that allow both products to ship on the same truck to deliver to two different tanks at the same facility. A chemical distributor might load their box van with drum, totes, or pallets to deliver multiple products to a single customer. Each of these users may reference the BOL number in the platform to find out how to handle the product, where to pick it up, where to deliver it, who to call with questions about loading and unloading, take or view pictures from the delivery, etc. |
| Shipments/ Routes | If a truck carries Orders in BOLs bound for more than one Ship To, the Orders can be combined into a single Shipment to optimize the delivery Route. Orders may be viewed in a combined shipment for the ease of the Driver to see an overview of his route. | A tanker truck carrying 4000 gallons of bleach may stop to deliver half of the bleach at one wastewater facility on one BOL and the other half to another wastewater facility on a different BOL. A chemical distributor might load their box van with drum, totes, or pallets to deliver multiple products to multiple customers on multiple BOLs. |
| Accessorial Fees | Fees in addition to a freight invoice for services the motor freight carrier performed beyond the standard pick-up and delivery operation designated at the time a shipment is tendered. The additional charges cover a wide variety of services outside of the line haul charge and fuel surcharge that are in connection with the transportation of goods. Fees incurred during a delivery can be noted and justified with documentation collected during the delivery that is stored in the Platform. The Shipper or Carrier may use the platform to only document these fees or they may choose to use the platform to send an invoice and use the platform's assessorial fee billing and collection service. | Common chemical shipment fees Detention Return Product Additional Stop Late Cancellation |
| Delivery Checklist Data Collected | Team Members involved in the loading, transfer, and unloading of products can reference and confirm compliance with the steps outlined in the custom checklists that are created as part of a Tenant's product and vessel profiles. | While there are paper checklists today to communicate safe handling and site-specific instructions, to recreate exactly what happened in a particular delivery requires combing back through paper checklists that sometimes get discarded and emails that sometimes get deleted, tracking down people who were present during the delivery, and hoping they will all remember accurately. Checklists are customizable to cover single products on a BOL and/or all the products on a BOL. |

TABLE 2-continued

Physical Delivery Transactions In Accordance with one Example Embodiment

| Transaction Component | Definition and General Examples | Chemical Shipment Examples |
|---|---|---|
| | | An example of the unloading checklist items for chemicals include wearing the proper PPE, noting the location of the safety shower and eyewash, connecting to the right tank, opening the right valves, ensuring the area is clear of people not wearing PPE, etc. |
| Photographs and Delivery Comments | Users can take photographs and make notes of any details associated with an individual delivery. Those details then are stored with the bill of lading information in central spot that is accessible by the carrier, the shipper, and the receiver at any time after the delivery has been completed. | For example, a driver of a chemical tanker may want to take a photo that the area was free from spills when he left the area, or she may want to photograph a pallet that was in the truck aisle that prevented access to the unloading tank and contributed to extra time that is then billed for detention. |
| Real Time Location of Transfer Vessel, Geofencing and/or Manual Time/Location Stamping | Being at the right place at the right time is an important part of moving goods efficiently. The mobile app updates during the delivery with the location and time at the location. | For example, a receiver may question why the carrier is charging for detention. With the invention, the receiver can see the timestamp and geostamp to confirm the driver's actual time without the need to contact the carrier or the shipper for this detail. |
| Scan | Vessels, like tanks, silos and tanker trailers, that do not already have digital scans codes may choose to use a platform generated code that Team Members can scan to confirm the vessel holds to product they need to load or unload or document the vessel that hauled a load. The mobile device that scans the code checks the database for a match of the product on the BOL with the product that is stored in the loading or unloading area, and/or compatibility of the transfer vessel (like tanker trailer). If a match is not made, the mobile app advises that it is the wrong product/wrong vessel/wrong location. If the product code on the storage vessel matches the product code in the BOL, the app confirms the match. Other uses of digital code scanning include Team Members. Team Members are all assigned a unique code that can be used to digitally sign for approving or accepting transactions, providing a touchless way to interact rather than to hand a clipboard with paper pen to sign. | For example, a truck driver arrives to load sodium hydroxide. He opens the mobile app to view the BOL for the location he is to load. He scans a tag on the loading tank to confirm that the product number and tank location match the BOL. If there is a match, he may proceed to load. He may or may not have a code to scan on the trailer that is hauling the sodium hydroxide to confirm compatibility with the materials of construction and to record the trailer number if there are concerns about contamination that later need to investigate the trailer. Once the driver arrives at the location that ordered the sodium hydroxide, he scans the tag on the unloading tank to confirm that it is the right product going to the right tank. If the unloading location has stringent quality standards, like additional certifications from NSF or AWW A, then those requirements can also be included in the tank profiles for loading and unloading to confirm the complete product profile requirements are met with the product that is to be unloaded. |
| Scaling | The platform can store product weight for net, gross, tare and returned product with API, data entered manually or using AI assisted OCR. | A tractor pulling a tractor trailer weighs their truck empty and with loaded product to calculate the amount of product that is shipping to the unloading tank. These weights are recorded and printed on a scale ticket that can be photographed and attached to the documentation for the delivery in the platform. The data on the weigh ticket may be uploaded to the platform manually or via AI assisted OCR. If the truck of sodium hydroxide gets to the unloading location and the tank does not have enough room to accept an entire load, the driver can make note of how much product was offloaded and how much was |

TABLE 2-continued

Physical Delivery Transactions In Accordance with one Example Embodiment

| Transaction Component | Definition and General Examples | Chemical Shipment Examples |
|---|---|---|
| | | returned to the shipper. This documentation can be referenced for assessorial fees. |

Platform Management Example

With options for how many data fields and which functions a Tenant may choose, in various examples, the Tenant Admin can customize their Users and the configuration of what data is collected, visible and analyzed. The platform can also have functions for the Super Admin to manage Tenants. Both the Tenant Admin and Platform Admin functions of one example embodiment are outlined in Table 3.

TABLE 3

Platform Management Example

| | |
|---|---|
| Super Admin— platform admin | The control panel to onboard, pause access, and offboard Tenants. Billing for using the platform services also falls under the Super Admin functionality. Super Admin administers access to the platform, the functionality available to a Tenant based on their license, provides trouble shooting and application support, and analyzes data collected from Tenants to provide benchmarking reports to the platform members. |
| Tenant Partner Search/Partner Network Maintenance | For Tenants that opt to be listed as a platform Tenant, they may connect or edit connections with other Tenants via an online directory. Tenants may also exchange Tenant IDs outside of the platform to discretely connect without being listed in a directory. |
| Tenant Data Entry | Data to populate the entities maybe uploaded by AI assisted OCR of shipping documents and physical asset tags, by spreadsheet, by manual entry, or via direct API connection to ERPs. The spreadsheet upload is created by downloading the required fields from the tenant's ERP system. |
| Tenant Data Sharing | Each tenant may selectively and securely share their information with other tenants. They may give other tenants access to the entities, like location, products, or tanks, or may give access only to information related to a particular bill of lading. |
| Tenant Assessorial Fee Configuration | Each tenant may choose to document the reasons for fees or not, and may choose to use the platform for invoicing and clearing payment or not. |
| Tenant Timeline and Scanning Configuration | Tenant may choose which features they want to use to have greater or lesser oversight of a delivery. As an example, a shipper may choose to require recording the tanker trailer VIN number that hauls a load or they may choose not to require it. They may also choose to use the feature to track arrival and departure times to load and unload or they may choose not to track this. |
| Tenant Analytics | Individual Tenants may choose to analyze Transaction data collected for their shipments. |
| Platform Analytics | Data from multiple Tenants may be anonymized and aggregated to provide benchmarking reports to understand their performance against their peers. |
| Help | FAQs and contact info to support the maintenance and use of the platform |

To better illustrate how the platform operates in some embodiments, the following continues the example for use in the chemical industry, but as discussed above, this example is not limiting on the wide variety of other applications that are within the scope and spirit of the present disclosure.

In various examples of bulk industrial chemicals, every physical transfer of chemicals from a supplier's tank to a customer's tank can be governed by a unique set of variables, some of which are constant and some of which can change every load. Knowledgeable workers who properly handle chemicals take vacations and turn over in their roles, creating an increased risk for costly and dangerous errors when loading and unloading chemicals. In various embodiments, the system helps people keep up to date with important safe handling information that is unique to a product and/or facility, accessible with a couple of swipes on a mobile device or clicks on a desktop. The system in various examples reduces or eliminates time-consuming phone calls, combing through piles of emails, or tracking down a person or a three-ring binder to find answers. New employees or employees covering for vacations can ramp up faster when backed by easy-to-access info that can be shared with trusted partner companies on the platform.

In various examples, each party in the transaction can create a profile for their company including contact information, physical location, and special instructions. Shippers can load the products that they sell into the platform along with their shipping locations. Shippers of bulk materials can load a profile of the storage tank or silo that holds the material so that the carrier of the material may know if there are special instructions that apply for this loading facility and scan the storage vessel to confirm it matches the bill of lading (BOL). Likewise, Receivers of bulk products may create profiles for the products, storage tanks and facilities where they receive goods. Carriers can create profiles with their drivers' information and trailer information. The platform can then coordinate this information between all three parties to give end-to-end visibility of what is required each step along the way.

For example, a chemical manufacturer produces a variety of products that are held in bulk storage tanks until they are shipped to customers via bulk tank trailer, drums or totes. Each of these products can have chemical properties, specifications, and handling requirements to keep people and the environment safe. Customers who buy these products may have bulk storage tanks where they also need to know information such as chemical properties, physical properties, handling characteristics, storage tank configurations, safety shower locations, type of equipment needed to load or unload at the tank, working hours, and contact information for plant personnel. This data can form a unique profile for each loading and unloading tank. Chemicals may be shipped via private carriers that the shipper owns or via third party common carriers who specialize in the transportation of bulk chemicals. Some customers may pick up the material themselves in their own specialized equipment. There can be updates to procedures or other changes that the driver needs to know, even if he/she/they have been to the facility before. Additionally, if the regular driver is on vacation or otherwise unavailable to deliver, a backup driver will likely not be as familiar with the requirements, increasing the odds of something going awry with the delivery.

Keeping with the bulk chemical example, the description of the user interface and how a tech stack of one example embodiment can be applied follow the example of a chemical company that ships bulk chemicals to their customers.

Figure 2:
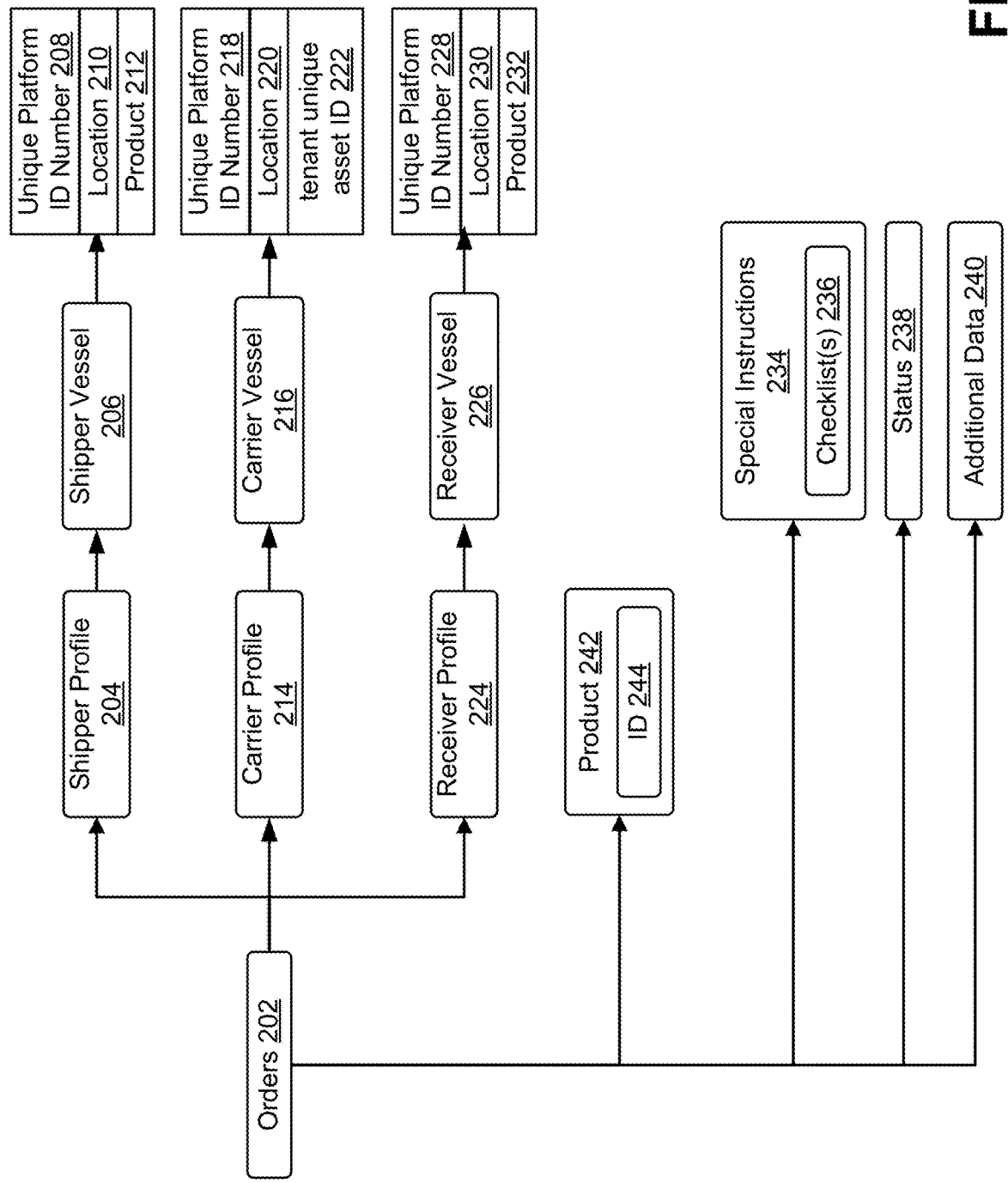
FIG. 2 shows an illustrative example data structure of an order that may be used by the delivery tracking system of FIG. 1, according to at least one embodiment.

FIG. 2 shows an illustrative example data structure map 200 of an order that may be used by the delivery tracking system of FIG. 1. As used herein, an order 202 may be an example of order/transaction 118, shipper, carrier, and receiver profiles 204, 214, 224 may be examples of tenants 120, shipper, carrier, and receiver vessels 206, 216, 226, as described in reference to FIG. 1. Additionally, product ID 212 and 232, and product data object 242 may also be examples of or refer to product 122 described above in reference to FIG. 1.

As illustrated in FIG. 2, an order may be associated with a number of different pieces of data, including shipper information 204-212, carrier information 214-222, receiver information 224-232, product information 242, special instructions 234 which may include one or more checklists 236, status 238, and/or additional data 240. As described herein, data structure map 200 may contain some or all of the data for an order described above, including some or all of the information contained in Tables 1 and/or 2. For example, additional data 240 may include accessorial fees, documentation or evidence, observed metrics of the product (e.g., weight, size condition, etc.), and various other forms of data that may be useful or necessary to effectuate transport of the product, such as QR codes, barcodes, or other identifiers of various entities stored and maintained in the system. In some cases, additional data 240 may include time stamp and/or location or geolocation information associated with the carrier device, carrier vessel, or product, or may be associated with another piece of data, such as a checklist or time a QR or barcode of a vessel or container is scanned.

In some cases, an order 202 may refer to a single product or multiple products that are to be shipped from and/or to the same receiving location. In some cases, multiple orders may be linked together to form a shipment, where the shipment may contain orders going or originating from different locations, different shipper/receiver profiles, or in some cases for different products having different requirements, which may be transported to and/or from the same location.

As illustrated, a tenant profile, such as profiles 204, 214, 224 may include vessel or storage location information 206, 216, 226 relating to that profile. In some cases, a single profile may have multiple different vessel or storage locations 206, 216, 226 for one or various products. Each storage vessel may have a unique ID number 208, 218, 228 that may be specific to the system, for storing and accessing specific details about a given vessel or container. Each vessel or container may also be associated with a location, such as 210, 220, 230. In the case of a carrier vessel, such as one that is mobile (e.g., a tanker, a truck, a shipping or cargo container, drums, etc.), the location may be a real time location, such as may be periodically updated via geolocation data from the carrier device or a tag or device attached to the vessel, or may be a home or primary location from which the carrier vessel is dispatched.

Each discrete piece of data in the data structure 200 may be associated with a identifier, and in some cases the identifier may be unique to the system and/or unique to a given profile or group of profiles, such as a product identifier 244, a vessel ID 208, 22, 232, and/or other pieces of information including the order, and different profiles. As described above, each different collection of data may be referred to as an entity. In some cases, ach entity may be accessed or retrieved or modified from data store 116 using the ID of that particular entity. In some cases, the system 102 may generate IDs for entities as they are ingested into the system. As described above the IDs may include a generated barcode or QR code or other identifier that may be identified via scanning the or taking an image of the identifier, to facilitate more efficient access into locating different entities (e.g., orders, products, vessels), in the system.

In some cases, special instructions 234 may include a list of instructions for handling a product or interacting with a vessel or container. In some cases, confirmation of compliance with a special instruction set may be requested and/or required to complete a deliver. In some cases, one or more checklists 236 (either passive or requiring evidence of compliance) may also be provided for an order, such as linked to a specific product, vessel, or profile. A status of an order 238 may be updated by the system to reflect certain characteristics of processing of the order. In one example, a status may be selected from the different statuses illustrated and described below in reference to FIG. 3. In some cases, the status 238 of an order may be linked to be associated with additional data 240, such as images, video, etc.

In some cases, the data store 116 may store other profiles, such as operator profiles, which may be linked or associated with one or more of a shipper or receiver, or even a carrier. As used herein, an operator may have a separate computing device and may facilitate processing an order on behalf of a shipper or receiver. In some cases, various tasks that may be performed to effectuate processing an order may be performed by a carrier and/or an operator. Operator profiles may take a similar form to carrier profiles, with the addition that they may be linked to a shipper or receiver profile, or otherwise given permission to access certain features in the system.

Figure 3:
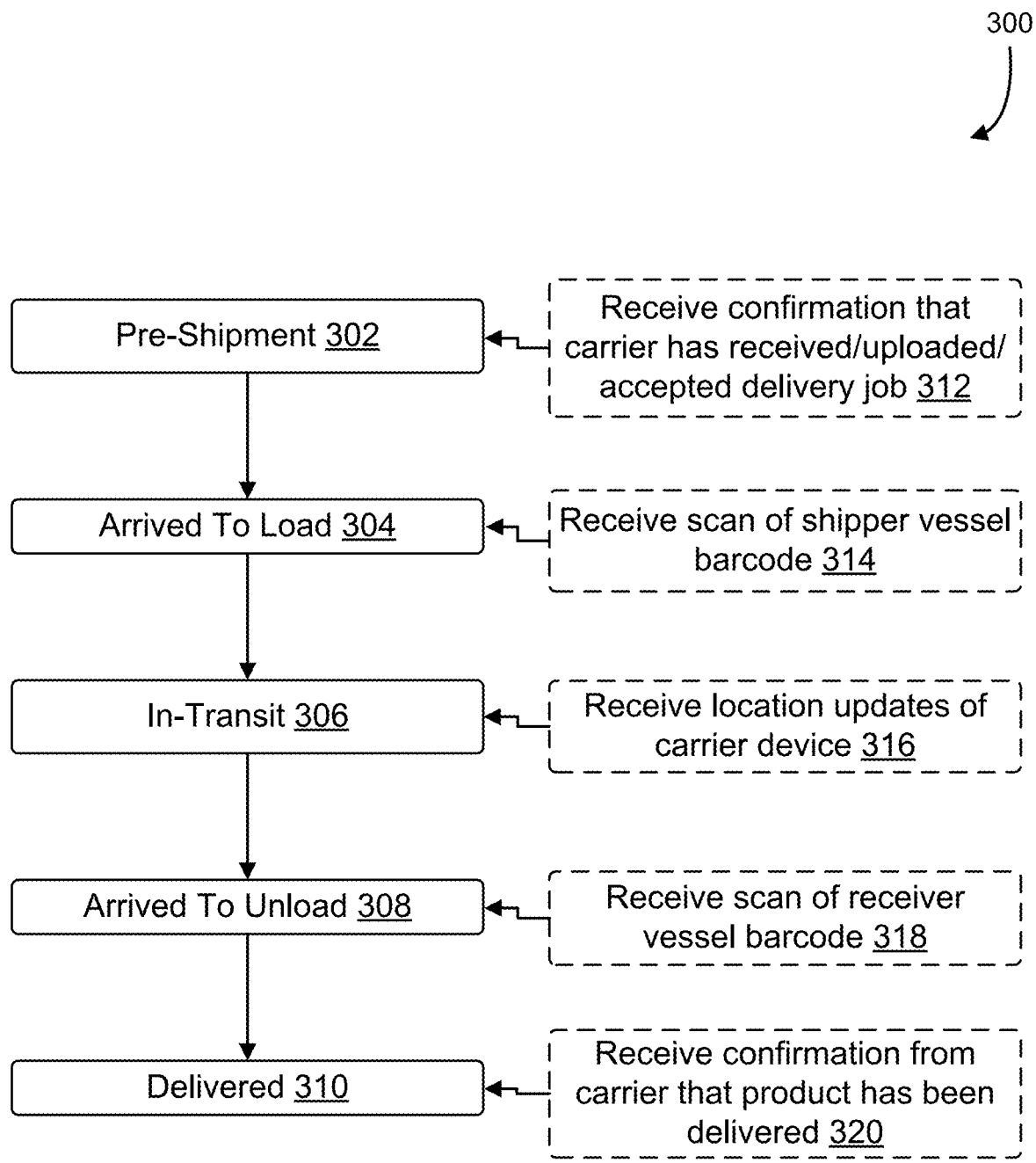
FIG. 3 shows an illustrative example of a timeline of status updates with example inputs that correspond to individual status updates, according to at least one embodiment.

FIG. 3 shows an illustrative example of a timeline 300 of status updates with example inputs that correspond to individual status updates, as may be utilized by system 102 described above. It should be appreciated the statuses illustrated, pre-shipment 302, arrived to load 304, in transit, 306, arrived to load 308, and delivered 310 are only given by way of example and that other statuses or the same statuses linked to different events other than events 312-320 illustrated are contemplated herein. In some aspects, the different statuses and linked or triggering events may be configurable by a given profile or user in the described system.

As illustrated, once an order has been entered into the system (e.g., manually entered through a graphical user interface provided by system 102, scanned from another source, scanned from a BoL, etc.) the order may be associated with a pre-shipment status 302. In some cases, this status may be associated with an order upon or after a confirmation has been recede by the system that a carrier has received uploaded or accepted a delivery job, represented by event or operation 312.

Next, upon receiving a scan of a shipper vessel barcode or QR code at operation 314, the described system may update the status of an order to arrived to load 304. In cases where a barcode or other identifier of a vessel or container is not available or associated in the system, geolocation information of the carrier device, or a manual entry of a location of the carrier via the carrier device may be sufficient to change the order to arrived to load status 304. Similarly, either upon a manual indication from the carrier device (or alternatively an operator device associated with the shipper), or a geolocation received from one of these devices, or both, indicating that the carrier device/vessel have left the shipper storage location, at operation 316, the status of the order may be changed to in-transit 306.

Upon receiving a scan of a barcode or QR code or other identifier of a receiver vessel, at operation 318, the system may change the status of the order to arrived to unload 308.

Similarly as described above changing to this status may additionally or alternatively be based on other indicators, such as location of the carrier device or vessel being within a given distance of the receiver vessel, etc. Upon receiving a confirmation from the carrier device that the product has been delivered (and/or from an operator associated with the receiver) at operation 310, the status of the order may be changed to delivered at 310.

It should be appreciated that other triggers or inputs (or combinations thereof) to the system may be used to infer or determine that the status of an order should be updated. In some cases, additional data received from a carrier or operator device may be used to trigger a status change. This additional data, as described above, may include time stamp and/or geolocation information, documentation of various stages or vessels or products associated with the order, uploading checklists or confirmations of completion of certain actions or tasks associated with the order or special instructions for the order.

Figure 4:
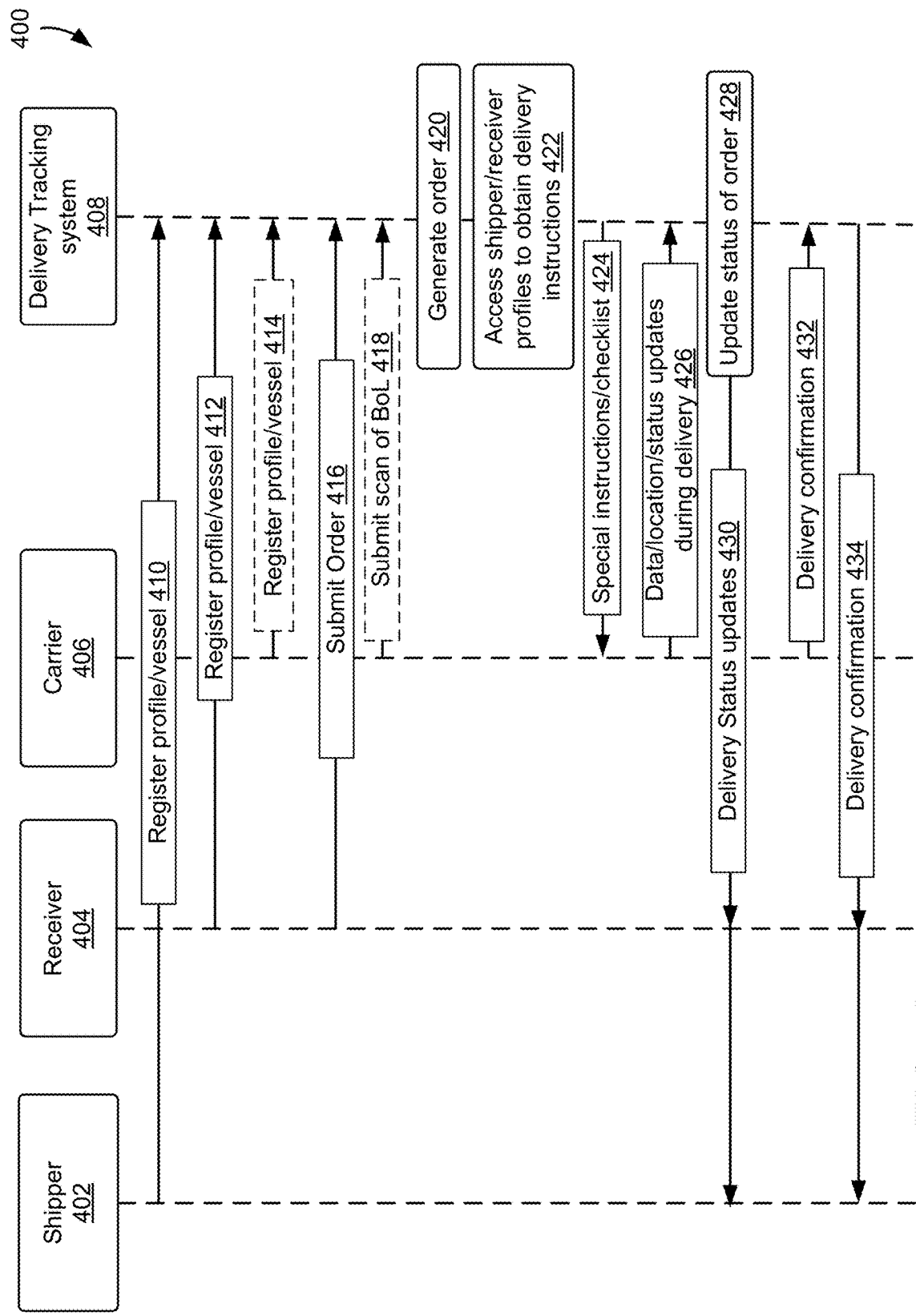
FIG. 4 shows an illustrative example of interactions of different entities with a delivery tracking system, according to at least one embodiment.

FIG. 4 shows an illustrative example of interactions 400 of different entities, including a shipper 402, a receiver 404, and a carrier 406, with a delivery tracking system 408. The delivery tracking system 408, and the shipper 402, a receiver 404, and/or a carrier 406 may include one or more aspects of similarly named entities or systems described above.

As illustrated, process 400 may begin or include a shipper 402 and a receiver 404 registering a profile, vessel, and/or products with the delivery tracking system 408 at operations 410 and 412. In some optional cases, as illustrated by the dotted lines, a carrier may also register with a profile and/or vessel with the delivery tracking system 408 at operation 414. In some cases, a carrier may only need access to the system to effectuate a delivery, and may not need to register specific entities of the carrier. In some examples, a receiver 404 may submit an order to the system 408 at operation 416, such as through one or more user interfaces provided by the system 408. In yet other optional cases, an order may be submitted via submitting a scan of a BoL, either by a carrier 406 at operation 418, or by a receiver 404 (not illustrated).

The system 408 may generate an order in the system, at operation 420, such as by generating and linking various data objects together, such as described above in reference to FIG. 2. The system 408 may access shipper and/or receiver profiles associated with the order at operation 422 to obtain delivery instructions, which may include special instructions, checklists, etc., specific to a given order. The system may send or communicate the instructions (and/or special instructions/checklists) to the carrier device 406 at operation 424. Before, during, and/or after the delivery, the carrier device 406 may send various updates, various data, such as location, timestamp information, etc., as described above, at operation 426. Responsive to obtaining that data, the system 408 may update the status of the order and communicate those updates to the receiver 404 and/or shipper 402 at operation 430. Upon completing the delivery, the carrier device 406 may send a delivery confirmation at operation 432, at which point the system 408 may communication the delivery confirmation to the shipper 402 and/or the receiver 404, at operation 434.

Figure 5:
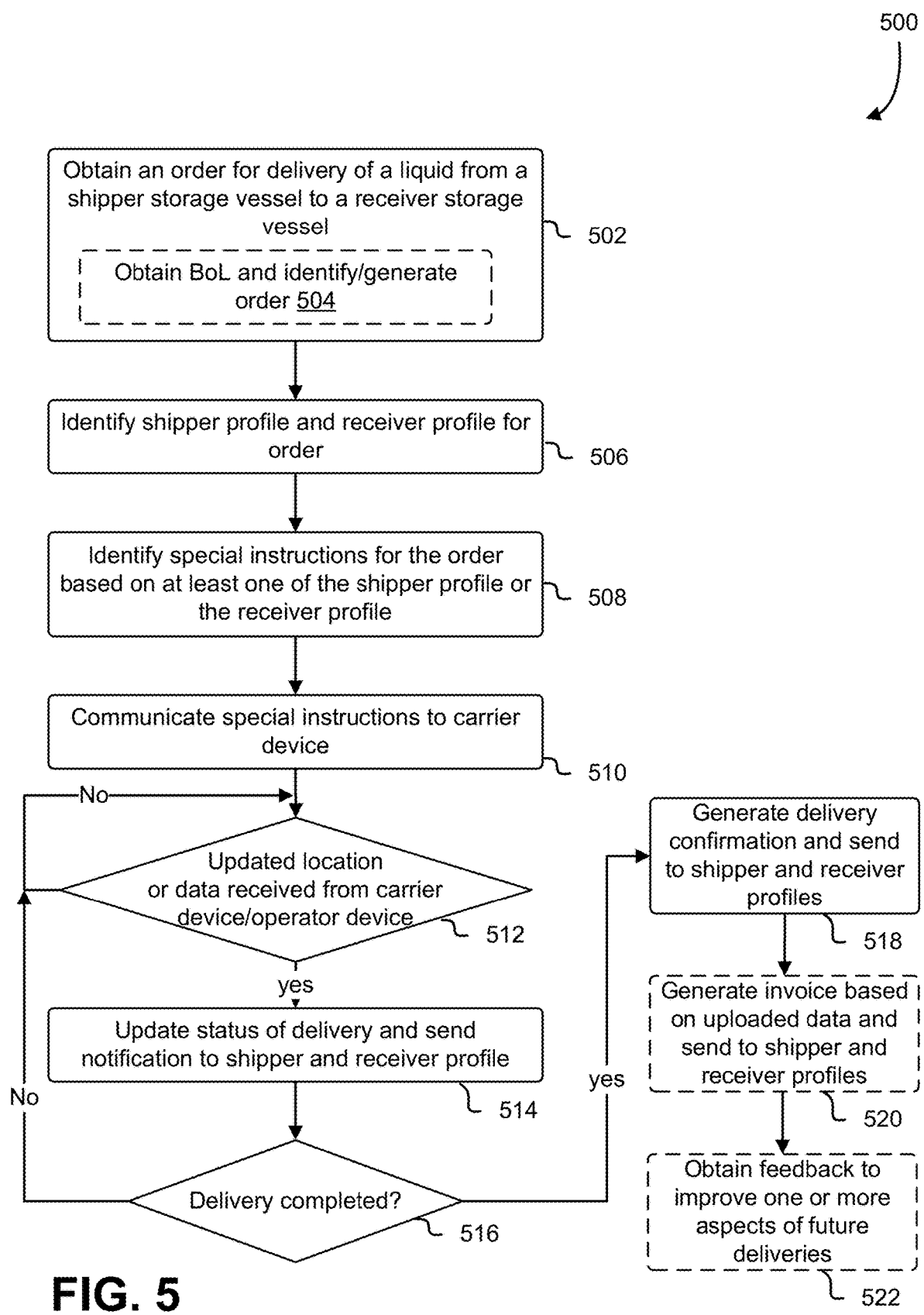
FIG. 5 shows an illustrative example of a process for tracking status of delivery of a fluid product, according to at least one embodiment.

FIG. 5 shows an illustrative example of a process 500 for tracking status of delivery of a fluid or liquid product, such as may be implemented by various components of system 102 and/or 408 described above. As used in FIGS. 5 and 6, dotted lines indicate optional, but not necessary operations of the described processes.

Process 500 may begin at operation 502 in which an order for delivery of a liquid from a shipper storage vessel to a receiver storage vessel may be obtained or received by a delivery tracking system. In some cases, the order may include an order for transport of liquid from a shipper storage location associated with a shipper to a receiver storage location associated with a receiver. In some aspects, operation 502 may optionally include obtaining a BoL and identifying or generating an order at operation 504. Operation 504 may include receiving an image of a bill of lading from the carrier device, and generating or identifying the order using the image of the bill of lading.

In some cases, operation 502 may include obtaining, by a delivery tracking system, a request to process an order, the order including an order for transport of a product from a shipper storage location to a receiver storage location. In some cases, the product includes an industrial liquid, the shipper storage location includes a first vessel, and the receiver storage location includes a second vessel.

Next, at operation 506, a shipper profile and a receiver profile, and in some cases a carrier profile if designated, may be identified or determined form the order, such as based on the shipper storage location the receiver storage location from the order, by accessing a database comprising a plurality of tenant profiles. In some cases, the shipper profile includes specifications associated with the shipper storage location, and the receiver profile includes specifications associated with the receiver storage location. In yet some examples, the shipper profile includes instructions for accessing the shipper storage location, and the receiver profile includes instructions for accessing the receiver storage location.

In some cases, instructions, and in some cases including special instructions, which may include one or more checklists for the order, may be identified or determined from the order, such as based on accessing the one or both of the shipper or receiver profiles, at operation 508. In some cases, the instructions/special instructions may include instructions for at least one of handling the industrial liquid, accessing the first vessel, or accessing the second vessel. The instructions and/or special instructions may be communicated to a carrier device, at operation 510, such as upon receiving an indication that a carrier/carrier device linked to the carrier has accepted the order for processing.

The system may check for updates (e.g., updated location, or uploaded data) received from the carrier device (and/or operator device as described above), at operation 512. If updated location or other data has been received, the status of the order may be updated accordingly, at operation 514. In some cases, operation 514 may include generating status updates on delivery of the product based on data uploaded to the delivery tracking system via the carrier device and associating the status updates with at least one of the shipper profile or the receiver profile, where the status updates include an indication of stages of delivery of the product to the receiver storage location.

In some examples, operation 514 may include automatically generating status updates on delivery of the liquid based on data uploaded to the system via the carrier device, and communicating the status updates to an interface associated with at least one of the shipper profile or the receiver profile, where the status updates include at least one location of the carrier device, and a scan of a barcode associated with at least one of the carrier storage tank or a receiver storage tank. In yet some examples, operation 514 may additionally include determining the status updates by selecting at least one of pre-shipment, arrived to load, in transit, arrived to unload, or delivered using the at least one location of the carrier device and the scan of the barcode associated with at least one of the carrier storage tank or the receiver storage tank.

If no updates have been received, the system may continue to wait and check for updated information from the carrier device, looping through operation 512. Once the status has been updated at operation 514, the system may determine whether the delivery is complete at operation 516. If not, the system may continue to loop through operations 512-516, until it is determined that the delivery is complete at operation 516, at which point a delivery confirmation may be generated and sent or associated with the shipper and/or receiver profiles, at operation 518. In some cases, optionally, an invoice may be generated based on the uploaded data and sent to the shipper and/or receiver, at operation 520. In yet some cases, feedback on the delivery process may be requested and obtained, at operation 522, to help refine delivery practices to improve the process. Collecting feedback may be particularly important in the case of a failed delivery to help increase efficiency in the future.

In some cases, the data uploaded to the system via the carrier device may include an indication of an issue associated with transporting the product from the shipper storage location to the receiver location evidence of the issue. In this scenario, process 500 may include generating an invoice including the evidence and associate the invoice with at least the receiver profile. In yet some examples, the data uploaded to the system via the carrier device includes an indication of an excess charge for the delivery and evidence supporting the excess charge, where the system generates an invoice including the excess charge and the evidence and associate the invoice with at least the receiver profile.

In cases where the instructions include a checklist, process 500 may include obtaining data from the carrier device indicating that the checklist has been completed, wherein generating the confirmation that the delivery has been completed is based on obtaining the data indicating that the checklist has been completed. In some cases, the data uploaded to the delivery tracking system via the carrier device may include timestamp information and geolocation information of the carrier device associated with at least one of the shipper storage location or the receiver location.

In cases where process 500 is not completed or delays occur, such as when updated information from the carrier is not received within a certain time (e.g., within a time period from the expected or confirmed delivery time or arrival or departure time from a given location), a messaging application may be initiated to help facilitate resolving the issue, enabling the carrier to communicate in real time with the shipper and/or receiver. This may include resolving access issues to facilitates, resolving confusion with special instructions, rescheduling the delivery, etc. In some cases, resolving issues with the delivery may include receiving an indication that there is an issue with at least one of acquiring the product from the shipper storage location or delivering the product to the receiver location from the carrier device, and responsive to receiving the indication of the issue, the system may initiate a communication session between the carrier device and at least one of a shipper device or a receiver device to resolve the issue.

In some aspects process 500 may include generating a user interface for display on the carrier device, the user interface including visual indicators of steps to be performed by the carrier to complete the delivery of the liquid, the visual indicators including visual outlines of selectable items of the user interface for performing operations to complete the delivery of the liquid. In yet some cases process 500 may additionally include receiving a change to the order from at least one of the shipper profile or the receiver profile, and responsive to receiving the change, initiating a messaging interface between a shipper device or the receiver device and the carrier device.

Figure 6:
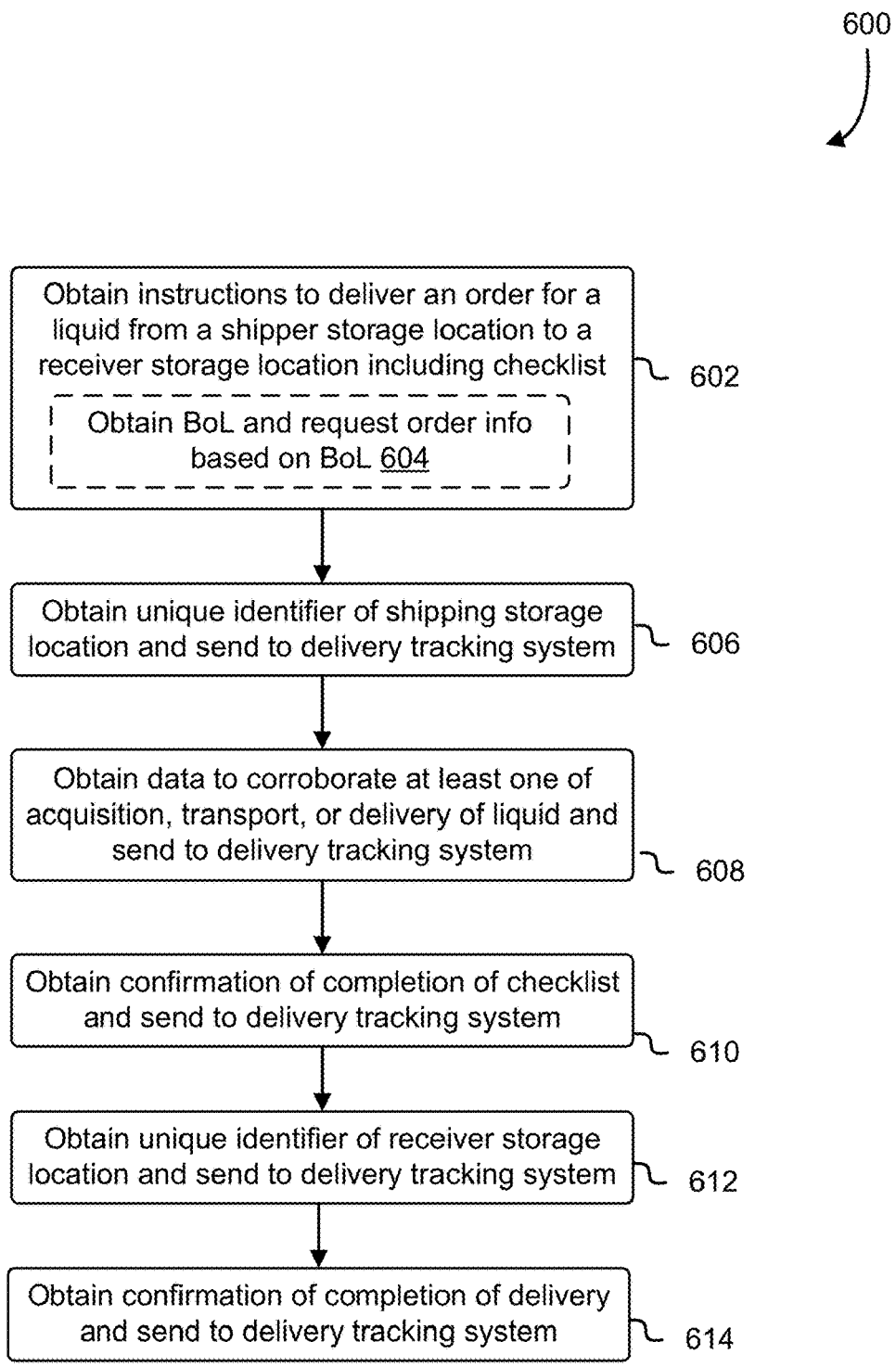
FIG. 6 shows another illustrative example of a process for tracking status of delivery of a fluid product, according to at least one embodiment.

FIG. 6 shows another illustrative example of a process 600 for tracking status of delivery of a product, such as may be implemented by various components of system 102 described above. In some aspects, process 600 may be performed by a carrier device executing a mobile application provided by system 102.

Process 600 may begin at operation 602, in which a carrier device may obtain instructions to deliver an order for a liquid (or other product) from a shipper storage location to a receiver storage location, where the order in some cases, includes a checklist. In some cases, operation 602 may include obtaining instructions, from a delivery tacking system, for an order including a delivery of a product from a shipper location to a receiver location, the instructions including a shipper storage location, a receiver storage location, an identifier of the product, and a checklist for completion of the delivery. In response to obtaining the instructions, the carrier device may display the instructions on the device. Optionally, operation 602 may include obtaining a BoL and requesting order information from the delivery tracking system based on the BoL, at operation 604.

Next, at operation 606, the carrier device may obtain a unique identifier of the shipper storage location and communicate the unique identifier to the delivery tracking system to cause the delivery tracking system to update a status of the delivery. At operation 608, the carrier device may obtain data to corroborate at least one of acquisition, transport, or delivery of liquid or product and may send the data to the delivery tracking system. The carrier device may obtain confirmation of completion of checklist and send the confirmation to the delivery tracking system, at operation 610. In some cases, operations 608 and 610 may cause the delivery tracking system to associate the data and the confirmation of the checklist with the order, so as to be able to update the shipper and/or receiver on the status of the order.

Next, the carrier device may obtain as unique identifier of receiver storage location and send the unique identifier to the delivery tracking system, at operation 612. Operation 612 may cause the delivery tracking system to update a status of the delivery based on the carrier device accessing the receiver storage location. The carrier device may then obtain confirmation of completion of delivery and send the confirmation to the delivery tracking system, at operation 614. Operation 614 may cause the system to update the status of the delivery to completed.

In some cases, operation 602 may include obtaining special instructions for delivery of the product from a shipper storage location to a receiver storage location and causing the special instructions to be displayed on the carrier device. Upon reeving a confirmation that the special instructions have been followed, the confirmation may be communicated to the delivery tracking system to cause the delivery tracking system to update the status of the delivery.

In some cases, process 600 may include obtaining an indication of an issue with processing the order from the carrier device, and responsive to obtaining the indication of the issue, initiating a communication session with at least one of the shipper profile or the receiver profile. In some examples, process 600 may include displaying a user interface on the carrier device, where the user interface visually indicates a plurality of sequential operations to be performed by the carrier to complete the delivery of the product.

In some aspects, the platform/system 102 can be built by combining APIs from third party software providers and custom database programming to collect, store, and retrieve data to help with getting the right product to the right place at the right time. Third party services in the tech stack may evolve over time to make better use of technology. One example tech stack is outlined below and the following section details how each feature/function of an example platform uses the tech stack for each of various features.

FIGS. 7-18 show example user interfaces, such as provided by the delivery tracking system of FIG. 1, for processing the delivery of products and illustrating various features of the described system.

Example Feature 1: Invite/Creation of Organization. A process to create a new organization in the platform and sign up as Admin for tenant. The Super-Admin can send an invitation to the provided email of the organization. The provided email.id can become the 1st Admin of the organization. An example API for implementing this feature is provided below.

| Front-end URL | Front-end Description | Backend API | Backend/ Cloud Component Associated | Description |
| --- | --- | --- | --- | --- |
| /tenant_ invitation | Visit URL and invite an Organization by Super Admin. | /tenant.invite | Auth0 Sendgrid PostgreSQL Django | This API is used to invite an organization. Required in some examples: Organization Email ID |

Example Feature 2: Add/Edit Users. Once the Tenant creation and the Admin Sign up is done. The admin can further add users to the tenant with the respective roles. An example API for implementing this feature is provided below.

| Front-end URL | Front-end Description | Back-end API | Backend/ Cloud Component Associated | Description |
| --- | --- | --- | --- | --- |
| /user_ invitation | Invite Team Members of Organization by Admin with their Email Id and select roles (Admin or Driver). | /user. invite | Auth0 Sendgrid PostgreSQL Django | This API is used to invite users of organization. Only Organization Admin can invite users. Required in some examples: User Email ID and Role like: Driver, Admin etc. |

Figure 7:
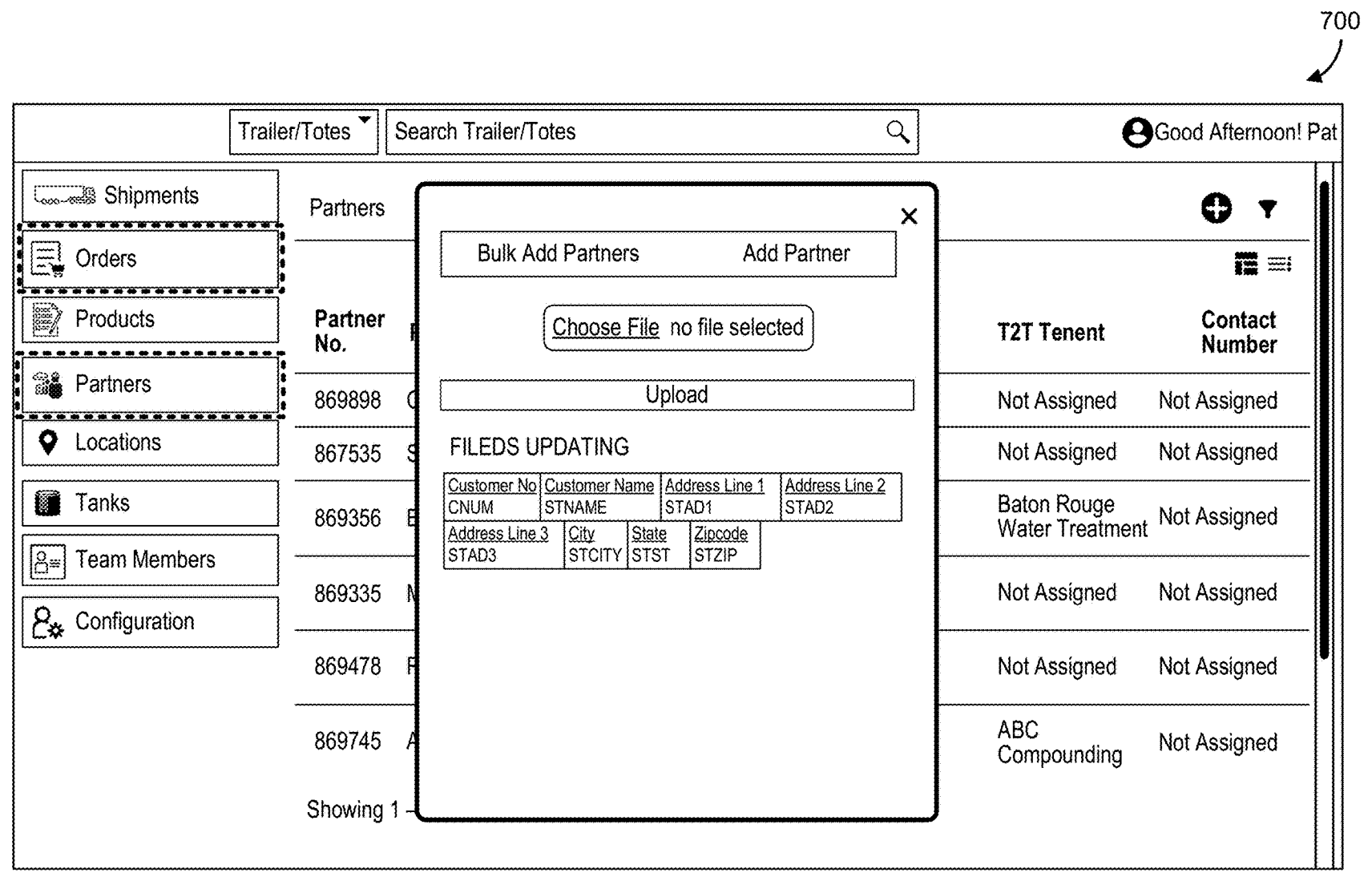

Example Feature 3: Add Partners. The shippers, carriers or receivers Tenants (organizations that are also platform members) that wish to share information on the platform are known as Partners. The minimal amount of information to add a Partner in some examples can be the partner's platform ID, name, address, and number as listed in the Tenant's ERP. The platform ID can allow the Tenants to share profile and transaction data. The backend can accept file (e.g., with these extensions: .csv/.exlx). The backend can parse each row of the file and can convert them into partners. The system can validate and check the column schemas for corrupted data or bad data, and update data that is stored in the data store. FIG. 7 illustrates an example user interface with selectable options for adding one or more partners/tenants to the system. An example API for implementing this feature is provided below.

| Front-end URL | Front-end Description | Backend API | Backend/ Cloud Component Associated | Description |
| --- | --- | --- | --- | --- |
| /customer-add | Add one or Bulk Partner with Excel sheet. To add one Partner requires EPR customer_no, name, tenant, location, and contacts. | /customer.add | Sendgrid PostgreSQL Django | This API is used to add Partners for Organization. Only Admin of Organization can add. Required in some examples: customer no., customer name, customer location, contacts. |

Figure 8:
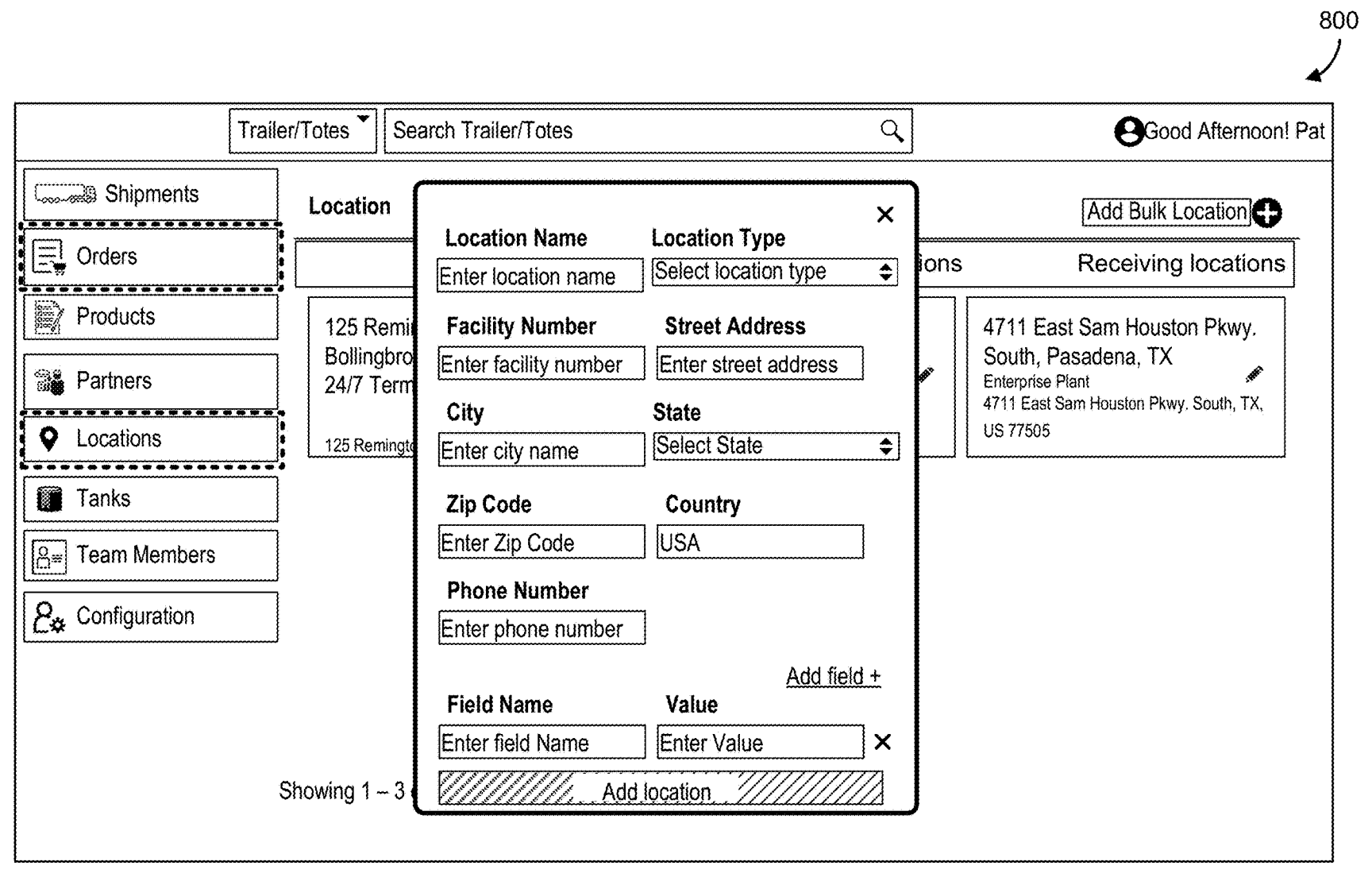

Example Feature 4: Add Locations. Locations can be physical locations that are associated with a Tenant. The locations can be added one by one manually, through bulk upload of a file, or via API connection to other databases. In some embodiments, a spreadsheet (e.g., excel) file to upload the locations fields in can have columns, i.e., Location Name, Location Type, Street Address, city, State, Zip code, country, phone number, Field name, Value. There can be various types of Tenant locations including one or more of. Shipping Location: e.g., The location of the source vessel (tank) that may or may not be physically owned by the Tenant. Carrier Location: e.g., the contact information for the carrier. Receiving Location: e.g., An unloading vessel (tank) location that may be physically owned by the Tenant or owned by a different company. FIG. 8 illustrates an example user interface for adding a location to the system. An example API for implementing this feature is provided below.

ship cargo hold, etc.) that will be used during the loading and unloading transactions of individual orders. Admins in various embodiments may either add/edit the information individually using UI forms or by bulk upload using a spreadsheet, or via API of other databases.

In some specific embodiments, at a minimum, stationary Vessels must be affiliated with a Location and a Product, so Location and Product must already exist in the platform to create a stationary Vessel (however, in some examples this is not the case). Location and the Tenant's unique asset ID (e.g., VIN number for trailers, railcar number, vessel name, tote number, etc.) can be the minimums to create a mobile Vessel in some embodiments. Mobile Vessels can be transient in their true physical locations, so they can be assigned to a primary location that dispatches them. An unlimited or limited number of fields can be added to adequately describe the Vessel to be able to safely and accurately load and unload from it.

| Front-end URL | Front-end Description | Backend API | Backend/Cloud Component Associated | Description |
|---|---|---|---|---|
| /add-location | Add one or Bulk Location with Excel sheet. To add one Location fill form with: - location name, type, address, city, select state, Zip code, and Phone No. | /location.create | Google Maps API PostgreSQL Django | This API is used to add locations of organization. Only Admin of Organization can add. Required in some examples: location name, location type, address, picture etc. There are three types of locations: shipper, carrier and receiver. |

Example Feature 5: Add Product Profiles. Tenants can add products to the platform that will be shipped or received. In some embodiments, at a minimum, a product must have a product name and a unique product ID, but in further embodiments a product can have more or less data. Tenants, in some examples, may add an unlimited or limited number of fields to describe the product more fully, like packing size, product family, product grade, product certifications, etc. Products can be added one by one or via bulk upload using a spreadsheet or API. An example API for implementing this feature is provided below.

As an example, bulk chemical Vessels, like liquid storage tanks, could include information such as the following: Tank Product Description: e.g., what product is stored in the tank; Storage Tank Details: e.g., materials of construction, volume, connection type, etc.; Safety Details: e.g., safety shower location, PPE required, etc.; Tank Trailer Details: e.g., type of trailer required to unload; Special Instructions: e.g., hours, extra hose, etc.; and/or Other Custom Fields.

The platform can assign each Vessel a unique platform ID number. A QR code can be generated to include (e.g., in some embodiments at a minimum) whether the Vessel is a

| Front-end URL | Front-end Description | Backend API | Backend/Cloud Component Associated | Description |
|---|---|---|---|---|
| /chemical-add | Add one or Bulk Product with Excel sheet. To add one Product fill form with: - Product Id, description, and class. | /chemical.create | Azure Blob Storage PostgreSQL Django | This API is used to add Product/Chemical. Required in some examples: product id, name etc. |

Example Feature 6: Create, View and Share Storage Vessel Profiles. Vessel profiles can provide specifications to load and/or unload the product that they store and the platform can generate digital codes or identifiers, like QR codes, to individually label vessels as the basis for confirming that the right product is being loaded or unloaded at the right vessel. The admins of an organization can add stationary or mobile storage vessel information (like tanks, returnable totes, drums, silos, tanker trailer, box van, barge, railcar, loading, transport, or unloading Vessel. Stationary Vessels' QR code can (an in some example must) include the product ID that the Vessel stores. This distinction of load v. unload can be so a product scan alone (if it did not have the load or unload vessel designation) is not sufficient to trigger a match, which could leave the possibility in some examples to skip scanning the load or unload tank and just scan the same tank twice.

The QR code of the Vessel can be downloaded, printed on an asset tag and affixed to the Vessel for use in verifying the right Product is loaded, transported, and unloaded in the right Vessel. An example of such a verification process is explained further in the Example Load and Unload Scan Feature 12 and 13. The platform user can customize the level of detail both digitally contained in the QR code and what is printed on the asset tag label that is downloaded.

Figure 9:
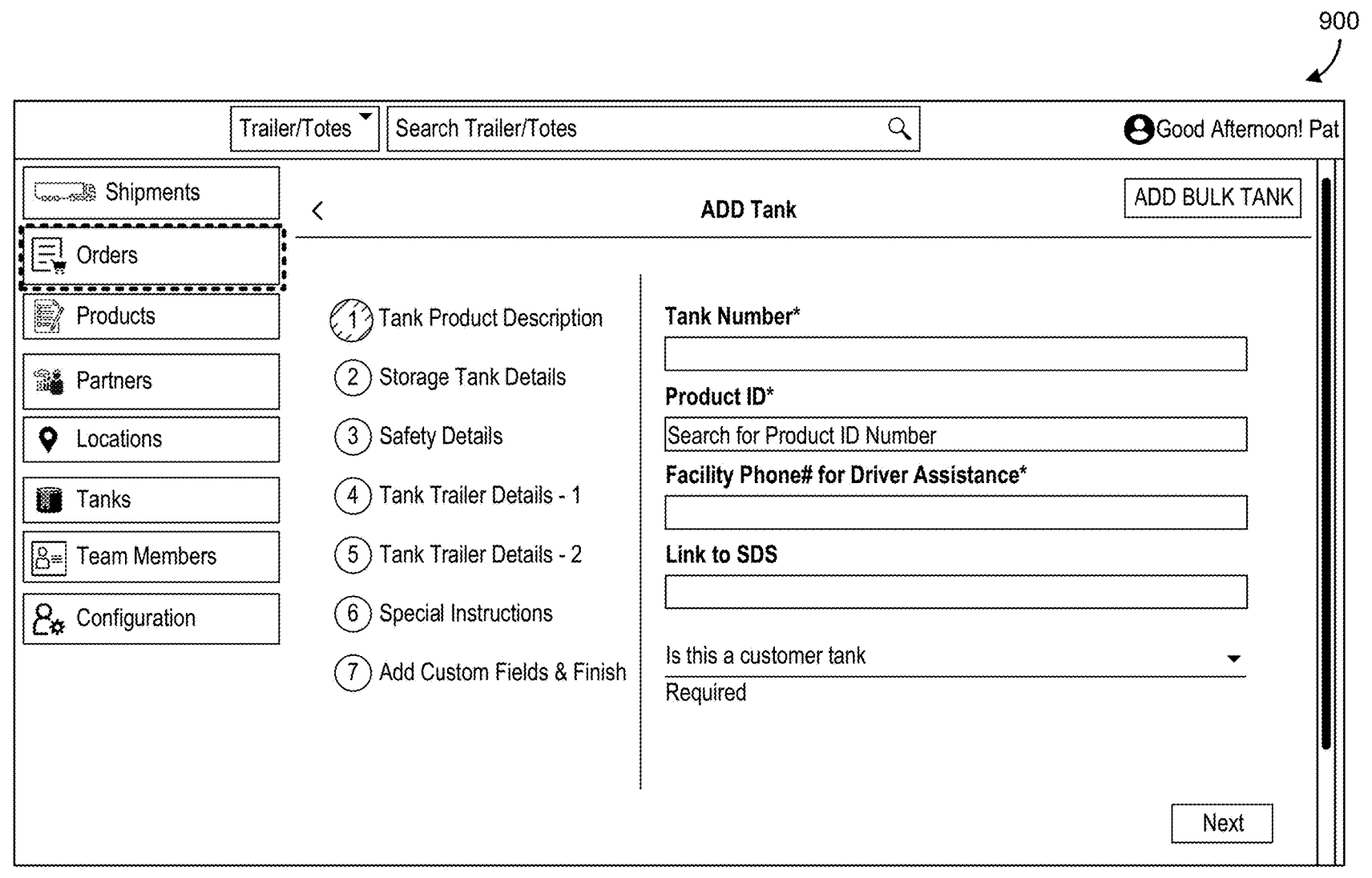

Vessel labeling and/or scanning systems can be various suitable devices or systems, which in some examples, can range from a simple reader that displays information without storing what is read, to a digital key to unlock a padlocked valve. The benefit, in various embodiments, of integrating the digital verification of right product, right vessel in the platform can include one or more of the following: Vessels each have a unique platform ID that can be specified to ensure compliance with loading and/or unloading from a particular Vessel by scanning the platform asset tag ID to confirm a match with the product on the bill of lading; Verification via QR code or other digital scan can be stored as one of the actions taken during the physical transfer of the Product, integrating it with other safety and procedural checklists; and/or Vessel profiles can be shared with other Tenants before, during and after a transaction to communicate the details needed to safely load and unload. FIG. 9 illustrates an example user interface for configuring a vessel within the system. An example API for implementing this feature is provided below.

| Front-end URL | Front-end Description | Backend API | Backend/ Cloud Component Associated | Description |
|---|---|---|---|---|
| /add-tank | Add one or Bulk Tank with Excel sheet. To add one Tank fill form with: - Tank Product Description Storage Tank Details Safety Details Tank Trailer Details - 1 Tank Trailer Details - 2 Special Instructions Add Custom Fields & Finish | /tank.create | Azure Blob Storage PostgreSQL Django | This API is used to add Tanks for Organizations. Only Admin of Organization can add. Required in some examples: Location Description, Tank Product Description, Storage Tank Details, Safety Details, Special Instructions, and Custom Fields & Finish. |

Figure 10:

Example Feature 7: Configure Checklist. Tenants can create custom checklists as how-to guides for people in the field to load, transport, and/or unload products safely and accurately. Checklists may be created to apply to all shipments to/from a Tenant or narrowed down to apply only for a particular Location, Product, or Tank. Checklists can be configured in a web application for use in a mobile application. The benefit, in some embodiments, of creating checklists in the platform v. paper or other digital checklist tool can include one or more of: can be shared instantly with Tenant employees in different locations and other platform members outside of the checklist-creating organization; Version control—what is used in the field can be published and pushed to platform members without the lag of print copy distribution and assurance that everyone has the right version; and/or Checklist compliance or notes about deviation from the standard are captured in the platform with a particular delivery along with pictures, comments and the load/unload scans. FIG. 10 illustrates an example user interface for configuring checklists. An example API for implementing this feature is provided below.

| Front-end URL | Front-end Description | Backend API | Backend/ Cloud Component Associated | Description |
|---|---|---|---|---|
| /admin_configuration | Visit URL and configure checklist Questions as per need with Answer option in | /checklist.create | Azure Blob Storage PostgreSQL Django | This API is used to add checklist by Admin of Organization. |

| Front-end URL | Front-end Description | Backend API | Backend/Cloud Component Associated | Description |
|---|---|---|---|---|
| | Text, Digit and Boolean(True, False) | | | Purpose: To make sure safety of Driver and workers and easy delivery of product. Required in some examples: Questions like: Do you have all PPE?, and Answer should be in text, digit or Boolean(true/false) |

Example Feature 8: Configure Offline Accessibility and Timeline. Drivers can access the shipments and orders without an internet connection in some embodiments. In the web client, the Tenant Admin can configure when to delete the orders from the mobile view, (e.g., orders older than 2 days should be deleted from offline storage, or orders for upcoming 5 days should only be stored offline, etc). The orders can be downloaded to the mobile device while connected to the internet and may then be updated online or offline.

An important part of an accurate delivery in some embodiments can include on time arrival. Tenants may choose to include geo and/or time stamping to a shipment to keep track of this metric of accurate delivery. In some examples, and option available inside a configuration tab in web admin can include to toggle the sequential timeline to appear or not appear in the mobile UI. FIG. FIG. illustrates an example timeline of status updates according to one embodiment. However, it should be appreciated that these status updates may be changed modified or customized for a variety of purposes. An example API for implementing this feature is provided below.

| Front-end URL | Front-end Description | Backend API | Backend/Cloud Component Associated | Description |
|---|---|---|---|---|
| /admin_configuration | Configure Timeline and Offline for BOL delivery. | /order.info | Postgresql Django | This API is used to track status and timeline of Order/BOL. |

Example Feature 9: Add/View Orders/Shipments. Shipments/Orders can be the central items tracked as transactions in the platform. In some embodiments, a shipper's bill of lading number can be the unique ID to which all information for an order is collected, stored, referenced, and selectively, securely shared with Partner Tenants. Orders can be defined as a single BOL and may include more than one product on the BOL. Shipments may combine BOLs to deliver to more than one receiving location.

The admin of the organization can add orders/shipments (e.g., using the web client) via various suitable routes including one or more of the following: Manually add shipment from the bill of lading; Bulk spreadsheet upload of bill of lading data; OCR/AI enhanced scan; and/or CRM API.

Figure 11:
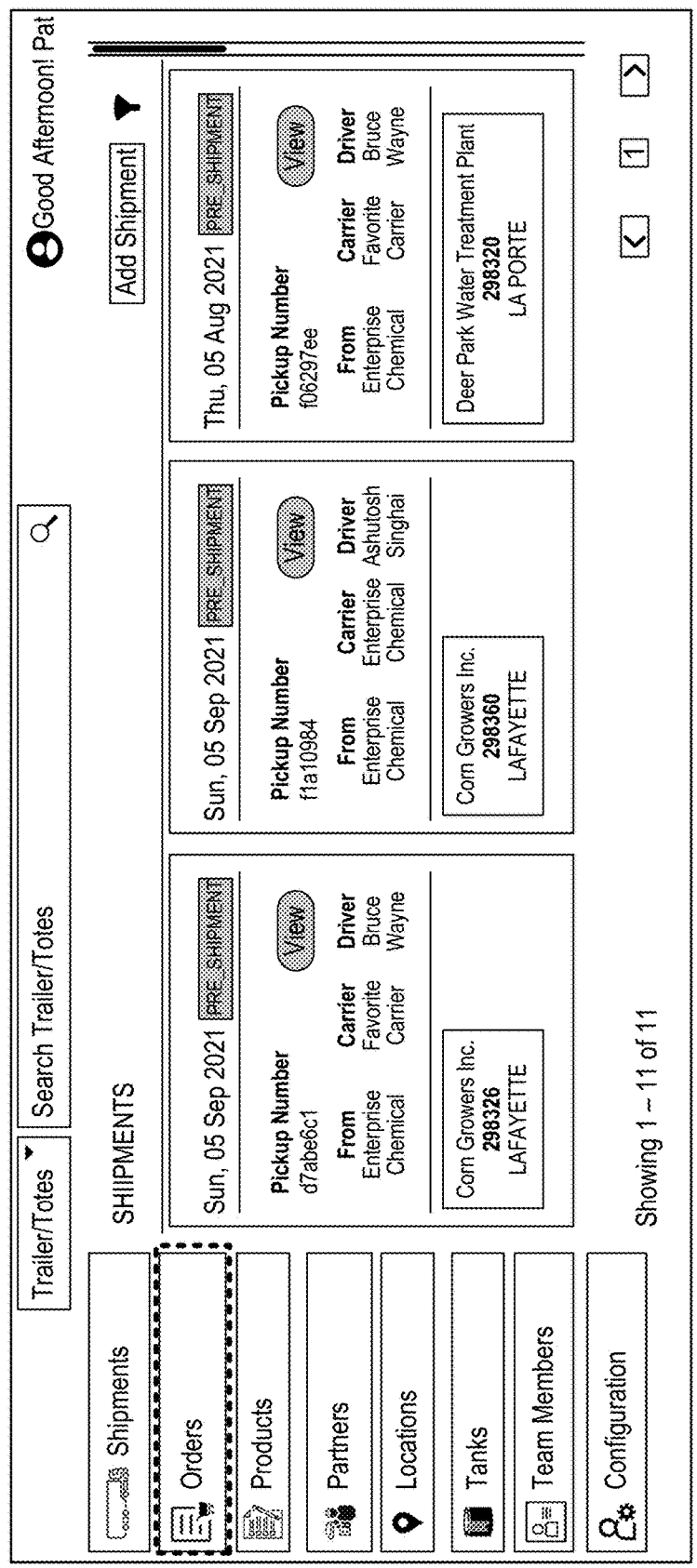

To view or add information collected during a delivery, the orders/shipments in web or mobile, from the Shipments or Orders tab, individual orders and shipments can be selected. FIGS. 11 and 12 illustrate example user interfaces for viewing delivery information, such as in desktop and mobile views.

In some examples, Location, Product, and Vessel can be created before Shipment upload. Parsing the data from spreadsheet→Fetching→creating a new customer for each row. Validation can include one or more of: Checking the columns name; Carrier should be: T2T Tenant; Driver should belong to the carrier Tenant; and/or Shipper and Receiver should be created in the application as a Location or Partner of the Tenant. An example API for implementing this feature is provided below.

| Front-end URL | Front-end Description | Backend API | Backend/ Cloud Component Associated | Description |
|---|---|---|---|---|
| /shipment-add | Add Shipment in Bulk with Excel Sheet. Visit URL, Browse correct file and upload it. Sheet must contain columns names are: - Bill Date - BLDATE Customer No. - CNUM Shipment Date - ACTUALSHIP Driver's Email - Driver Product ID - PNUM Ordered Qty - QORD BOL No. - BL Shipped Qty - QTYSHIP Carrier ID (T2T Tenant ID) - Shipvia Customer P.O. - CUSTPO Gross Weight - Grossweight | /shipment.create | Azure Blob Storage PostgreSQL Django | This API is used to create shipments by Shipper Organization. Only Admin of Organization can create. Required in some examples: Details of: - Shipper, Carrier, Trailer, Driver and Status of shipment like: arrived to load, completed etc |

Example Feature 10: Update Timeline for a Single BOL/Order [e.g., Mobile Data Entry]. In various embodiments, admins and drivers can see the shipment/order status and timestamp of each action at any time through a web or mobile interface. The status can be updated via the Driver's mobile client.

Figure 14:
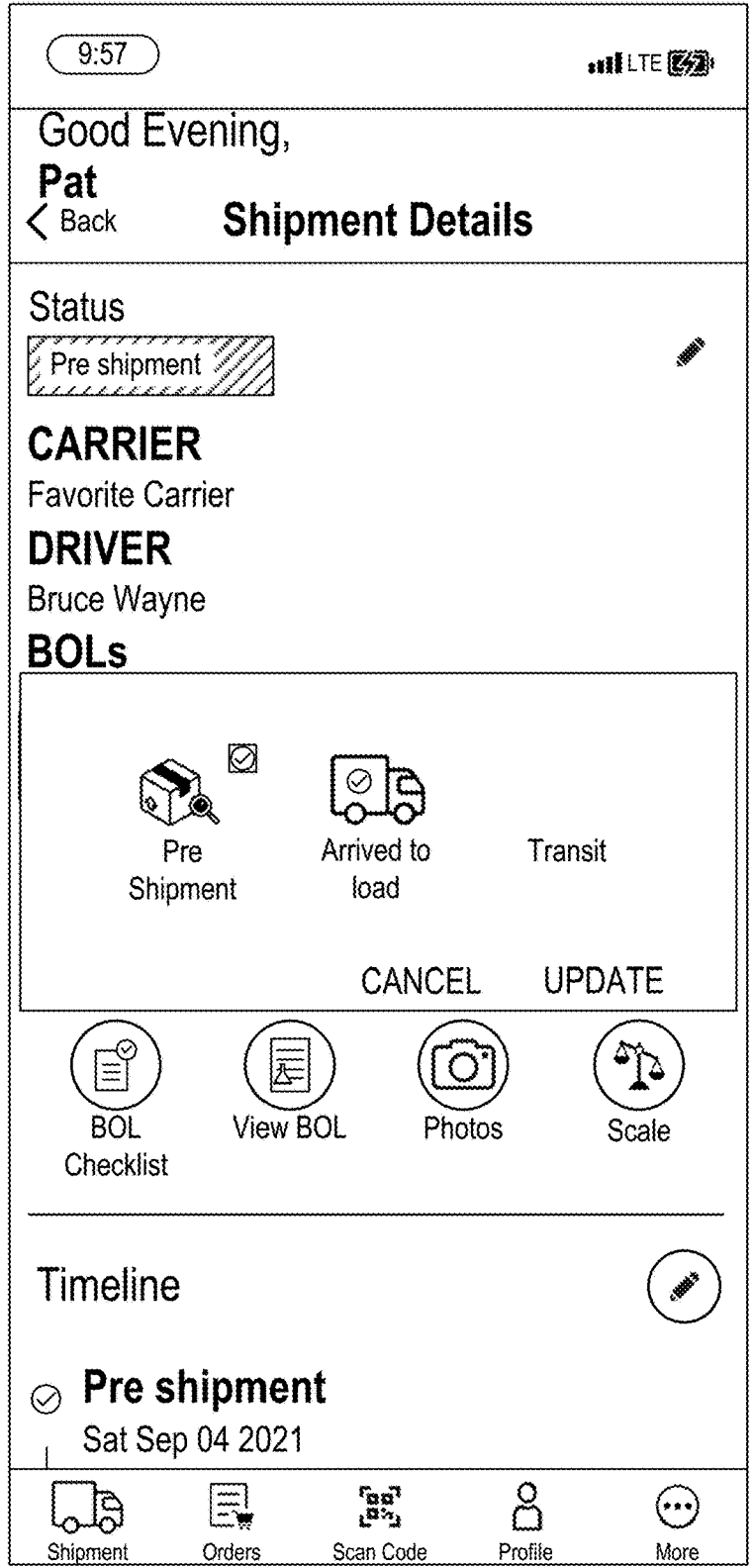

In some examples, orders have one of the below 5 statuses at a time: Pre shipment (default), Arrived to load, In Transit, Arrived to unload, or Delivered. Both shipment status and order status can be updated from the mobile app using a manual process. Geofencing can update the timeline automatically for drivers in the field. FIGS. 13 and 14 illustrate example user interfaces for tracking shipments. An example API for implementing this feature is provided below.

| Front-end URL | Front-end Description | Backend API | Backend/ Cloud Component Associated | Description |
|---|---|---|---|---|
| ** | Driver will update timeline to track movement of BOL's. | /order.status.update | Postgresql Django Google Maps API | This API is used to update Status and timeline of BOL. Admin and Driver can update status. Required in some examples: User need to choose a value from existing options. |

Example Feature 11: Update Checklist for a Single BOL/Order [e.g., Mobile]. Drivers can update the checklists at the order level and/or product level as set during checklist configuration (e.g., in Feature 7). Mobile interface for checklist can include clicking on the checkboxes, entering text, and clicking a save button. Admins of the organization can see the items the drivers update in various examples, including Loading checklist: e.g., Checklist related to loading of the products, and Unloading checklist: e.g., Unloading of the products. An example API for implementing this feature is provided below.

| Front-end URL | Front-end Description | Backend API | Backend/ Cloud Component Associated | Description |
|---|---|---|---|---|
| ** | Driver need to give Answer to all BOL checklist Questions. | /checklist.info. update | Postgresql Django | This API is used to update checklist according to BOL and Customer. |

Example Feature 12: Load Scan [e.g., Mobile]. Mobile users scan the vessel QR codes at the loading location that were created in the platform in (see e.g., Feature 6) to make sure that right product is loaded. Scanning can give error if the product to be loaded as listed on the BOL doesn't match the product inside tank and give a positive confirmation if it is the right product.

This scan can contain (and in some examples at a minimum) the Tenant's unique product ID and can confirm that vessel is a loading vessel. Other parameters may also be included in various embodiments to confirm it is the right product, for example a restriction to a single tank at a particular location. Scan results can be viewed in web and mobile in various embodiments. An example API for implementing this feature is provided below.

| Front-end URL | Front-end Description | Backend API | Backend/ Cloud Component Associated | Description |
|---|---|---|---|---|
| ** | Driver will scan QR code of Tank to verify right Product is loading in Trailer. | /tank.compatibility. check | Postgresql Django | This API is used to check compatibility of Tank and Trailer with product during product load. Driver will perform this action. Required in some examples: Process(loading), product description and tank Description. |

Example Feature 13: Unload Scan [e.g., Mobile]. Scanning the storage vessel QR code at the delivery location can ensure that the product will be unloaded into the right vessel for the right receiver. Scanning can give an error message if the product to be unloaded does not match the product inside unloading tank. A positive message can appear if it is the right product for the right vessel. Scan results can be viewed in web and mobile in various examples. An example API for implementing this feature is provided below.

| Front-end URL | Front-end Description | Backend API | Backend/ Cloud Component Associated | Description |
|---|---|---|---|---|
| ** | Driver will scan QR code of Tank to verify right Product is unloading in Tank. | /tank.compatibility. check | Postgresql Django | This API is used to check compatibility of Tank and Trailer with product during product load. Driver will perform this action. Required in some examples: Process(unloading), product description and tank Description. |

Example Feature 14: Take Photos and/or Add Comments to a BOL [e.g., Mobile]. To document a smooth delivery or notable events during a delivery, photos and/or comments may be added to an associated BOL number. Comments and/or photos may be viewed and edited in web or mobile in various examples. An example API for implementing this feature is provided below.

| Front-end URL | Front-end Description | Backend API | Backend/ Cloud Component Associated | Description |
| --- | --- | --- | --- | --- |
| ** | Driver or mobile admin will upload photo for record that product get delivered. Customer can also upload photos for complain or feedback. | /order.picture. update | Azure Blob Storage PostgreSQL Django | This API is used to upload the photos and comments of BOL for verification and feedback. Shipper, Driver and Customer can upload photos and comments. Required in some examples: Mobile. |

Figure 15:
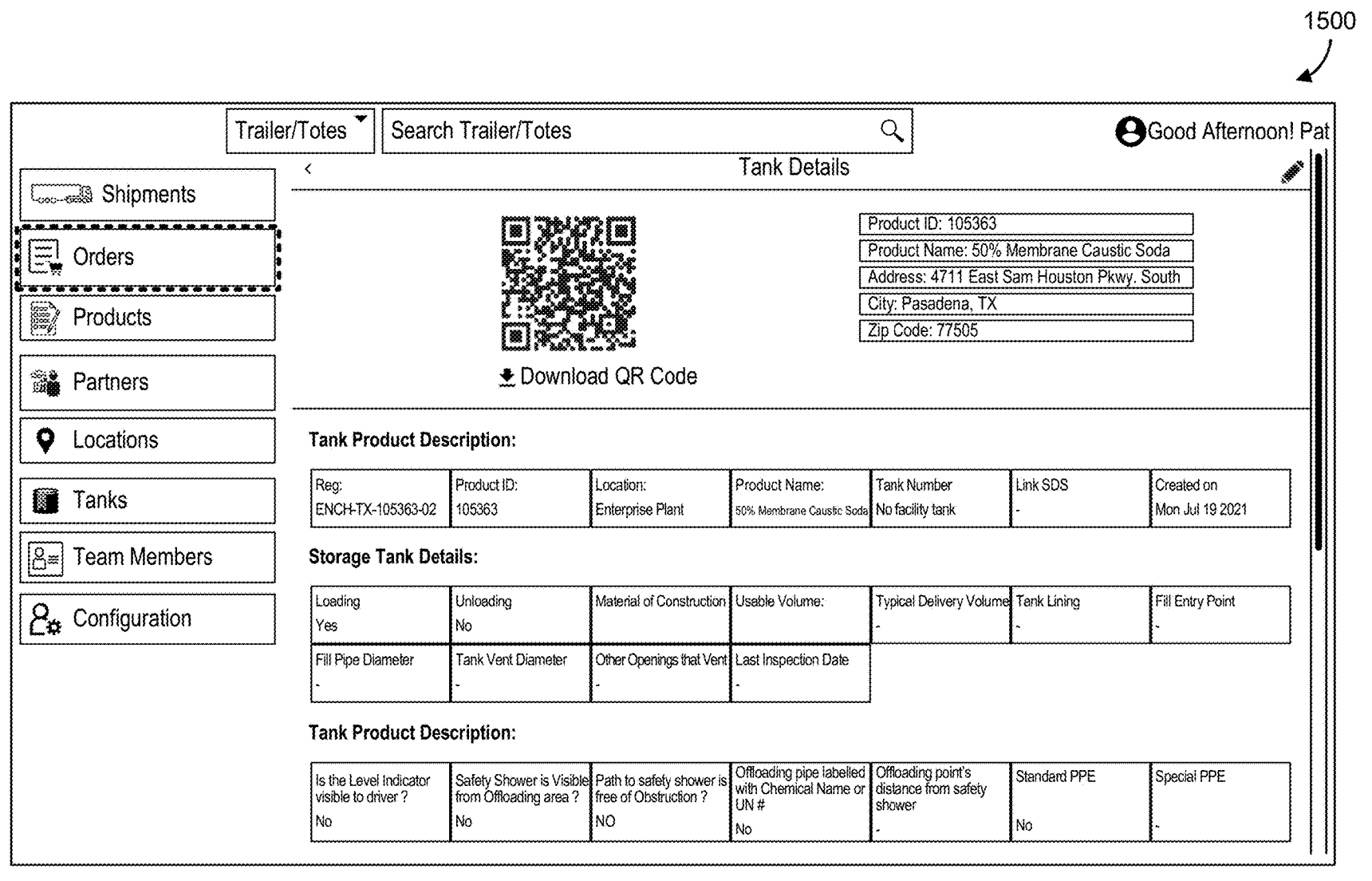
Figure 16:

Example Feature 15: View Storage Vessel Profile and Add Comments [e.g., Mobile and Web]. Drivers and admins can access vessel profiles add/update the special instructions to the vessel from the tank details page, including photos that can help visualize important details. FIGS. 15 and 16 illustrate example user interfaces for viewing and modifying vessel profile information. An example API for implementing this feature is provided below.

| Front-end URL | Front-end Description | Backend API | Backend/ Cloud Component Associated | Description |
| --- | --- | --- | --- | --- |
| /tank-details/ {tank-id} | Comments about the tank. Any useful information associated with the tanks. Both drivers and admins can add a comment. | /tank.info.update | None | Comments about the tank are stored in the database, corresponding to that tank. |

Figure 17:

Example Feature 16: Document and Invoice Assessorial Fees. During a delivery, additional fees may be incurred beyond the agreed upon freight rate. Examples of these fees can include, detention, returned product fee, rescheduling fees, etc. A Shipper or Carrier Tenant can document these fees using, for example, the timestamping, geofencing, comment and photo features. FIG. 17 illustrates an example user interface of accessorial fees. An example API for implementing this feature is provided below.

| Front-end URL | Front-end Description | Backend API | Backend/ Cloud Component Associated | Description |
| --- | --- | --- | --- | --- |
| /order-details/ {order-id} | The fields for all kinds of fees associated with the delivery, and weight of returned product will be entered and a PDF invoice will be generated. | /order.info & /order.info.update | OCR for reading the weight tickets and auto- filling the scale and weight info. | 1. Carrier tenant and driver can update the fees 2. Used for to show and update different charges, which required during product delivery. |

Example Feature 17: Analytics. Analytics can provide insights for opportunities to improve delivery accuracy, safety and efficiency. Tenant level reporting can examine data associated with an individual Tenant. Platform level reporting can pull data from multiple Tenants. A non-exhaustive list of examples of reports that can pull data from multiple shipments at the Tenant and/or Platform level include, no. of active/inactive team members, profiles created in a date range, last edited date for data fields, performance of the delivery using shipper, carrier, and receiver's feedback and delivery rating, average time spent loading or unloading, and the like. Reports can be downloaded as Excel or .csv files or may be visualized on in the web UI with dashboards. FIG. 18 illustrates an example user interface of system analytics. An example API for implementing this feature is provided below.

as development and database management. In an embodiment, these devices also include other electronic devices, such as dummy terminals, thin-clients, gaming systems and other devices capable of communicating via a network, and virtual devices such as virtual machines, hypervisors, software containers utilizing operating-system level virtualization and other virtual devices or non-virtual devices supporting virtualization capable of communicating via a network.

In an embodiment, a system utilizes at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer

| Front-end URL | Front-end Description | Backend API | Backend/ Cloud Component Associated | Description |
|---|---|---|---|---|
| /dashboard | Admins can view Graphs Active users, customers Recent shipments/orders Top rated deliveries Top selling products, etc. | /analytics.info | | 1. Analytics processing for extracting meaningful insights. 2. Querying database for finding historical data, generating the summary and sending it to frontend for displaying. |

FIGS. 19-23 show example user interfaces, such as provided by the delivery tracking system of FIG. 1 to a carrier device, for processing the delivery of products. FIGS. 19-23 illustrate example views 1900-2300 of a user interface that may be accessed and displayed on a carrier device. Views 1900-2300 illustrate an example user interface guide to performing sequential steps in processing and completing a delivery, including uploading correct documentation of the delivery to facilitate accurate and complete status updates of the delivery process. Views 1900-2300 include visual indicators 1902, 2002, 2004, 2006, 2102, 2202, 2204, 2206, 2208, and 2308, which may include flashing icons or outlines of icons, flashing colors of those icons, darkening or otherwise coloring those icons or other visual indicators, of operations or selection items that need to be accessed to complete the next step in processing a delivery. This feature of the described systems and techniques may be particularly beneficial in aiding carriers and other users as to how to complete a delivery process, particularly when special or complex instructions are involved, as can frequency be the case in handling large volumes of liquids and/or hazardous liquids and other materials and products.

The various embodiments further can be implemented in a wide variety of operating environments, which in some cases can include one or more user computers, computing devices or processing devices which can be used to operate any of a number of applications. In an embodiment, user or client devices include any of a number of computers, such as desktop, laptop or tablet computers running a standard operating system, as well as cellular (mobile), wireless and handheld devices running mobile software and capable of supporting a number of networking and messaging protocols and such a system also includes a number of workstations running any of a variety of commercially-available operating systems and other known applications for purposes such Protocol ("FTP"), Universal Plug and Play ("UpnP"), Network File System ("NFS"), Common Internet File System ("CIFS") and other protocols. The network, in an embodiment, is a local area network, a wide-area network, a virtual private network, the Internet, an intranet, an extranet, a public switched telephone network, an infrared network, a wireless network, a satellite network, and any combination thereof. In an embodiment, a connection-oriented protocol is used to communicate between network endpoints such that the connection-oriented protocol (sometimes called a connection-based protocol) is capable of transmitting data in an ordered stream. In an embodiment, a connection-oriented protocol can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In an embodiment, the system utilizes a web server that run one or more of a variety of server or mid-tier applications, including Hypertext Transfer Protocol ("HTTP") servers, FTP servers, Common Gateway Interface ("CGI") servers, data servers, Java servers, Apache servers, and business application servers. In an embodiment, the one or more servers are also capable of executing programs or scripts in response to requests from user devices, such as by executing one or more web applications that are implemented as one or more scripts or programs written in any programming language, such as Java®, C, C # or C++, or any scripting language, such as Ruby, PHP, Perl, Python or TCL, as well as combinations thereof. In an embodiment, the one or more servers also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. In an embodiment, a database server includes table-based servers, document-based servers, unstructured servers, relational servers, non-relational servers, or combinations of these and/or other database servers.

In an embodiment, the system includes a variety of data stores and other memory and storage media as discussed above which can reside in a variety of locations, such as on a storage medium local to (and/or resident in) one or more of the computers or remote from any or all of the computers across the network. In an embodiment, the information resides in a storage-area network ("SAN") familiar to those skilled in the art and, similarly, any necessary files for performing the functions attributed to the computers, servers or other network devices are stored locally and/or remotely, as appropriate. In an embodiment where a system includes computerized devices, each such device can include hardware elements that are electrically coupled via a bus, the elements including, for example, at least one central processing unit ("CPU" or "processor"), at least one input device (e.g., a mouse, keyboard, controller, touch screen, or keypad), at least one output device (e.g., a display device, printer, or speaker), at least one storage device such as disk drives, optical storage devices, and solid-state storage devices such as random access memory ("RAM") or read-only memory ("ROM"), as well as removable media devices, memory cards, flash cards, etc., and various combinations thereof.

In an embodiment, such a device also includes a computer-readable storage media reader, a communications device (e.g., a modem, a network card (wireless or wired), an infrared communication device, etc.), and working memory as described above where the computer-readable storage media reader is connected with, or configured to receive, a computer-readable storage medium, representing remote, local, fixed, and/or removable storage devices as well as storage media for temporarily and/or more permanently containing, storing, transmitting, and retrieving computer-readable information. In an embodiment, the system and various devices also typically include a number of software applications, modules, services, or other elements located within at least one working memory device, including an operating system and application programs, such as a client application or web browser. In an embodiment, customized hardware is used and/or particular elements are implemented in hardware, software (including portable software, such as applets), or both. In an embodiment, connections to other computing devices such as network input/output devices are employed.

In an embodiment, storage media and computer readable media for containing code, or portions of code, include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. Similarly, use of the term "or" is to be construed to mean "and/or" unless contradicted explicitly or by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," (i.e., the same phrase with or without the Oxford comma) unless specifically stated otherwise or otherwise clearly contradicted by context, is otherwise understood with the context as used in general to present that an item, term, etc., may be either A or B or C, any nonempty subset of the set of A and B and C, or any set not contradicted by context or otherwise excluded that contains at least one A, at least one B, or at least one C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}, and, if not contradicted explicitly or by context, any set having {A}, {B}, and/or {C} as a subset (e.g., sets with multiple "A"). Thus, such conjunctive language is not generally intended to imply that certain embodiments require at least one of A, at least one of B and at least one of C each to be present. Similarly, phrases such as "at least one of A, B, or C" and "at least one of A, B or C" refer to the same as "at least one of A, B, and C" and "at least one of A, B and C" refer to any of the following sets: {A}, {B}, {C}, {A, B}, {A, C}, {B, C}, {A, B, C}, unless differing meaning is explicitly stated or clear from context. In addition, unless otherwise noted or contradicted by context, the term "plurality" indicates a state of being plural (e.g., "a plurality of items" indicates multiple items). The number of items in a plurality is at least two but can be more when so indicated either explicitly or by context.

Operations of processes described herein can be performed in any suitable order unless otherwise indicated herein or otherwise clearly contradicted by context. In an embodiment, a process such as those processes described herein (or variations and/or combinations thereof) is performed under the control of one or more computer systems configured with executable instructions and is implemented as code (e.g., executable instructions, one or more computer programs or one or more applications) executing collectively on one or more processors, by hardware or combinations thereof. In an embodiment, the code is stored on a computer-readable storage medium, for example, in the form of a computer program comprising a plurality of instructions executable by one or more processors. In an embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In an embodiment, code (e.g., executable code or source code) is stored on a set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media, in an embodiment, comprises multiple non-transitory computer-readable storage media and one or more of individual non-transitory storage media of the multiple non-transitory computer-readable storage media lack all of the code while the multiple non-transitory computer-readable storage media collectively store all of the code. In an embodiment, the executable instructions are executed such that different instructions are executed by different processors—for example, a non-transitory computer-readable storage medium store instructions and a main CPU execute some of the instructions while a graphics processor unit executes other instructions. In an embodiment, different components of a computer system have separate processors and different processors execute different subsets of the instructions.

Accordingly, in an embodiment, computer systems are configured to implement one or more services that singly or collectively perform operations of processes described herein and such computer systems are configured with applicable hardware and/or software that enable the performance of the operations. Further, a computer system that implement an embodiment of the present disclosure is a single device and, in another embodiment, is a distributed computer systems comprising multiple devices that operate differently such that the distributed computer system performs the operations described herein and such that a single device does not perform all operations.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A fluid delivery tracking system, comprising:
one or more processors; and
memory in communication with the one or more processors, that stores computer-executable instructions that, upon execution, cause the system to:
receive an order for transport of liquid from a shipper storage location associated with a shipper to a receiver storage location associated with a receiver;
determine a shipper profile for the shipper based on the shipper storage location and a receiver profile for the receiver based on the receiver storage location by accessing a database comprising a plurality of shipper and receiver profiles, the shipper profile comprising instructions for accessing the shipper storage location, and the receiver profile comprising instructions for accessing the receiver storage location;
determine a set of special instructions for processing the order from data associated with at least one of the shipper profile or the receiver profile;
communicate the set of special instructions for processing the order to the carrier device;
automatically generate status updates on delivery of the liquid based on data uploaded to the system via the carrier device, and communicate the status updates to an interface associated with at least one of the shipper profile or the receiver profile, the status updates comprising a unique combination of one or more procedures for completing a stage of the delivery of the liquid and at least one of:
a location of the carrier device, or
a scan of a QR code associated with at least one of a shipper storage tank located at the shipper storage location or a receiver storage tank located at the receiver storage location;
receive, from the carrier device, a request for a digital security key of a locking device to access one or more of the shipper storage tank or the receiver storage tank, the request comprising an identifier of a locking device;
upon verifying that the carrier device is authorized to access the one or more of the shipper storage tank or the receiver storage tank, provide the digital security key to the carrier device to unlock the locking device of one or more of the shipper storage tank or the receiver storage tank; and generate a confirmation that the delivery of the liquid has been completed based on the data obtained from the carrier device and communicate the confirmation to a first device associated with the shipper profile and a second device associated with the receiver profile.

2. The system of claim 1, wherein the memory stores additional computer executable instructions that, if executed, further cause the system to:

receive an image of a bill of lading from the carrier device; and generate or identify the order using the image of the bill of lading.

3. The system of claim 1, wherein the computer executable instructions that cause the one or more processors to automatically generate the status updates of delivery of the liquid based on data uploaded to the system via the carrier device further comprise instructions, that, if executed, further cause the system to:

determine the status updates by selecting at least one of pre-shipment, arrived to load, in transit, arrived to unload, or delivered using the at least one location of the carrier device and the scan of the QR code associated with at least one of the shipper storage tank or the receiver storage tank.

4. The system of claim 1, wherein the memory stores additional computer executable instructions that, if executed, further cause the system to:

based on the confirmation that the delivery of the liquid has been completed from the carrier device, generate an invoice for the delivery and associate the invoice with the shipper profile and the receiver profile.

5. The system of claim 1, wherein the data uploaded to the system via the carrier device comprises an indication of an excess charge for the delivery of the liquid and evidence supporting the excess charge, wherein the memory stores additional computer executable instructions that, if executed, further cause the system to:

generate an invoice including the excess charge and the evidence and associate the invoice with at least the receiver profile.

6. The system of claim 1, wherein the set of special instructions comprises a checklist of steps to be performed to complete the delivery of the liquid, and wherein the data uploaded to the system via the carrier device comprises an indication that the checklist has been completed.

7. The system of claim 1, wherein the memory stores additional computer executable instructions that, if executed, further cause the system to:

generate a user interface for display on the carrier device, the user interface comprising visual indicators of steps to be performed by the carrier to complete the delivery of the liquid, the visual indicators comprising visually outlines of selectable items of the user interface for performing operations to complete the delivery of the liquid.

8. The system of claim 1, wherein the memory stores additional computer executable instructions that, if executed, further cause the system to:

receive a change to the order from at least one of the shipper profile or the receiver profile; and responsive to receiving the change, initiate a messaging interface between a shipper device or the receiver device and the carrier device.

9. The system of claim 1, wherein the status updates comprising at least one location of the carrier device, and a scan of a QR code permanently affixed to at least one of the carrier storage tank or a receiver storage tank.

10. A computer-implemented method, comprising:

obtaining, by a delivery tracking system, a request to process an order, the order comprising an order for transport of a product from a shipper storage location to a receiver storage location;

identifying a shipper profile for the shipper based on the shipper storage location and a receiver profile for the receiver based on the receiver storage location by accessing a database comprising a plurality of tenant profiles, the shipper profile comprising specifications associated with the shipper storage location, and the receiver profile comprising specifications associated with the receiver storage location;

determining a set of instructions for processing the order from data associated with at least one of the shipper profile or the receiver profile;

communicating the set of instructions for processing the order to a carrier device;

generating status updates on delivery of the product based on data uploaded to the delivery tracking system via the carrier device, and associate the status updates with at least one of the shipper profile or the receiver profile, the status updates comprising:

an indication of stages of delivery of the product to the receiver storage location;

a location of the carrier device; and one or more procedures for completing individual stages of the stages of delivery of the product;

receive, from a device, a request for a digital security key to access one or more of the shipper storage location or the receiver storage location;

upon verifying that the device is authorized to access the one or more of the shipper storage location or the receiver storage location, provide the digital security key to the device to allow access of one or more of the shipper storage location or the receiver storage location; and generating a confirmation that the delivery of the product has been completed based on the data obtained from the carrier device and associate the confirmation with the shipper profile and the receiver profile.

11. The computer-implemented method of claim 10, wherein the product comprises an industrial liquid, the shipper storage location comprises a first vessel, and the receiver storage location comprises a second vessel.

12. The computer-implemented method of claim 11, wherein the set of instructions for processing the order comprise special instructions for at least one of handling the industrial liquid, accessing the first vessel, or accessing the second vessel.

13. The computer-implemented method of claim 11, wherein the set of instructions for processing the order comprise a checklist relating to handling of the industrial liquid, and wherein the method further comprises:

obtaining data from the carrier device indicating that the checklist has been completed, wherein generating the confirmation that the delivery has been completed is based on obtaining the data indicating that the checklist has been completed.

14. The computer-implemented method of claim 10, wherein the data uploaded to the delivery tracking system via the carrier device further comprises timestamp information and geolocation information of the carrier device associated with at least one of the shipper storage location or the receiver location.

15. The computer-implemented method of claim 10, further comprising:
receiving an indication that there is an issue with at least one of acquiring the product from the shipper storage location or delivering the product to the receiver location from the carrier device; and
responsive to receiving the indication of the issue, initiate a communication session between the carrier device and at least one of a shipper device or a receiver device.

16. The computer-implemented method of claim 10, wherein the data uploaded to the system via the carrier device comprises an indication of an issue associated with transporting the product from the shipper storage location to the receiver location evidence of the issue, wherein the method further comprises:
generating an invoice including the evidence and associate the invoice with at least the receiver profile.

17. The computer-implemented method of claim 10, wherein generating the status updates on the delivery of the product is further based on data uploaded to the delivery tracking system via an operator device, wherein the operator device is associated with at least one of the shipper or the receiver.

18. A non-transitory computer-readable storage medium having stored thereon executable instructions that, as a result of being executed by one or more processors of a computer system, cause the computer system to at least:
obtain instructions, from a delivery tacking system, for an order comprising a delivery of a product from a shipper location to a receiver location, the instructions comprising a shipper storage location, a receiver storage location, an identifier of the product, and a checklist for completion of the delivery, and cause the instructions to be displayed on a carrier device;
obtain a unique identifier of the shipper storage location and communicate the unique identifier to the delivery tracking system to cause the delivery tracking system to generate a first status of the delivery;
obtain data corroborating at least one of acquisition, transport, or delivery of the product from the shipper storage location to the receiver storage location and confirmation of completion of the checklist, and communicate the obtained data and confirmation to the delivery tracking system to cause the delivery tracking system to associate the data and the confirmation with the order;
obtain a unique identifier of the receiver storage location and communicate the unique identifier of the receiver storage location to the delivery tracking system to cause the delivery tracking system to generate a second status of the delivery;
in response to obtaining one or more of the unique identifier of the shipper storage location or the unique identifier of the receiver storage location:
verify that the carrier device or another device is authorized to access the one or more of the shipper storage or the receiver storage location; and
provide a digital key to access the one or more of the shipper storage or the receiver storage location; and
obtain confirmation that the delivery has been completed and communicate the confirmation to the delivery tracking system to cause the delivery tracking system to generate a third status of the delivery indicating that the delivery has been completed, wherein the first status and the second status each further comprise one or more procedures for completing individual stages of delivery of the product.

19. The non-transitory computer-readable storage medium of claim 18, wherein the instructions further comprise instructions that, as a result of being executed by the one or more processors, cause the computer system to:
obtain special instructions for delivery of the product from a shipper storage location to a receiver storage location and cause the special instructions to be displayed on the carrier device; and
obtain confirmation that the special instructions have been followed and communicate the confirmation to the delivery tracking system to cause the delivery tracking system to update one or more of the first status, the second status, or the third status of the delivery.

20. The non-transitory computer-readable storage medium of claim 18, wherein the instructions further comprise instructions that, as a result of being executed by the one or more processors, cause the computer system to:
obtain an indication of an issue with processing the order from the carrier device; and
responsive to obtaining the indication of the issue; initiate a communication session with at least one of the shipper profile or the receiver profile.

21. The non-transitory computer-readable storage medium of claim 18, wherein the instructions further comprise instructions that, as a result of being executed by the one or more processors, cause the computer system to:
display a user interface on the carrier device, wherein the user interface visually indicates a plurality of sequential operations to be performed by the carrier to complete the delivery of the product.

* * * * *